US008113704B2

United States Patent
Bae et al.

(10) Patent No.: US 8,113,704 B2
(45) Date of Patent: Feb. 14, 2012

(54) BACKLIGHT UNIT HAVING LIGHT GUIDE PLATES

(75) Inventors: Seung Choon Bae, Suwon-si (KR); Seung Se Kim, Yongin-si (KR); Hoon Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 12/618,603

(22) Filed: Nov. 13, 2009

(65) Prior Publication Data

US 2010/0053506 A1    Mar. 4, 2010

Related U.S. Application Data

(63) Continuation of application No. 12/453,885, filed on May 26, 2009.

(30) Foreign Application Priority Data

| May 27, 2008 | (KR) | 10-2008-0049146 |
| Jun. 27, 2008 | (KR) | 10-2008-0061487 |
| Oct. 10, 2008 | (KR) | 10-2008-0099569 |
| Apr. 22, 2009 | (KR) | 10-2009-0035029 |

(51) Int. Cl.
*F21V 7/04* (2006.01)
*G02F 1/1335* (2006.01)

(52) U.S. Cl. ............ 362/613; 362/612; 349/61; 349/65; 349/67

(58) Field of Classification Search .................. 349/61, 349/65, 67; 362/612–613
See application file for complete search history.

(56) References Cited

U.S. PATENT DOCUMENTS

| 5,704,703 A | 1/1998 | Yamada et al. |
| 5,717,422 A | 2/1998 | Fergason |
| 6,011,602 A * | 1/2000 | Miyashita et al. .............. 349/65 |
| 6,241,358 B1 | 6/2001 | Higuchi et al. |
| 6,456,343 B2 | 9/2002 | Kim et al. |
| 6,816,141 B1 | 11/2004 | Fergason |
| 7,125,152 B2 | 10/2006 | Lin et al. |
| 7,311,431 B2 | 12/2007 | Chew et al. |
| 7,312,838 B2 | 12/2007 | Hwang et al. |
| 7,413,330 B2 | 8/2008 | Furukawa |
| 7,641,375 B2 | 1/2010 | Fujita et al. |
| 2001/0017774 A1 | 8/2001 | Ito |

(Continued)

FOREIGN PATENT DOCUMENTS

EP      0 987 490      5/2010

(Continued)

OTHER PUBLICATIONS

International Search Report dated Jan. 8, 2010.

(Continued)

*Primary Examiner* — Nathanael R Briggs
(74) *Attorney, Agent, or Firm* — KED & Associates, LLP

(57) ABSTRACT

An LED back-light unit and other devices using the LED back-light unit are discussed. According to one embodiment, an LED back-light unit includes a light guide portion that includes a light guide plate and a reflection plate coupled to the light guide plate, wherein the light guide plate has a light input part and a first connection part, and wherein the reflection plate has a second connection part connected to the first connection part, and a light source including at least one light emitting diode, the light source emitting light toward the light guide portion.

42 Claims, 25 Drawing Sheets

U.S. PATENT DOCUMENTS

| | | | |
|---|---|---|---|
| 2003/0206253 | A1 | 11/2003 | Cho |
| 2005/0248939 | A1 | 11/2005 | Li et al. |
| 2005/0276075 | A1 | 12/2005 | Chen et al. |
| 2006/0114690 | A1* | 6/2006 | Iki et al. .................. 362/612 |
| 2006/0209564 | A1 | 9/2006 | Lin et al. |
| 2006/0221638 | A1 | 10/2006 | Chew et al. |
| 2006/0239033 | A1* | 10/2006 | Jung et al. ............... 362/612 |
| 2006/0245213 | A1* | 11/2006 | Beil et al. ................ 362/616 |
| 2007/0247869 | A1 | 10/2007 | Lang et al. |
| 2007/0247871 | A1* | 10/2007 | Yoo ........................... 362/612 |
| 2008/0205080 | A1 | 8/2008 | Erchak et al. |
| 2011/0051045 | A1 | 3/2011 | Hur et al. |

FOREIGN PATENT DOCUMENTS

| | | |
|---|---|---|
| JP | 64029708 | 2/1989 |
| JP | 01-261692 | 10/1989 |
| JP | 08-160425 | 6/1996 |
| JP | 09-171111 A | 6/1997 |
| JP | 09-186825 | 7/1997 |
| JP | 09-292531 | 11/1997 |
| JP | 11-288611 | 10/1999 |
| JP | 2002-228844 A | 8/2002 |
| JP | 2004-206916 | 7/2004 |
| JP | 2005-259361 A | 9/2005 |
| JP | 2005-317480 | 11/2005 |
| JP | 2006-054410 A | 2/2006 |
| JP | 2006-108033 | 4/2006 |
| JP | 2006-0134748 | 5/2006 |
| JP | 2006-269364 A | 10/2006 |
| JP | 2006-286638 | 10/2006 |
| JP | 2007-250197 A | 9/2007 |
| JP | 2007-250979 A | 9/2007 |
| JP | 2007-265837 A | 10/2007 |
| JP | 2007-293339 A | 11/2007 |
| JP | 2008-108622 | 5/2008 |
| JP | 2008-108623 A | 5/2008 |
| JP | 2008/192395 | 8/2008 |
| JP | 2009-054990 A | 3/2009 |
| KR | 2001-0012532 | 2/2001 |
| KR | 10-2001-0085460 A | 9/2001 |
| KR | 10-2003-016631 | 3/2003 |
| KR | 10-2005-0067858 | 7/2005 |
| KR | 10-2005-0067903 | 7/2005 |
| KR | 10-2005-0112661 A | 12/2005 |
| KR | 10-2006-0106774 | 10/2006 |
| KR | 10-2007-0001657 | 1/2007 |
| KR | 10-2007-0002920 A | 1/2007 |
| KR | 10-2007-0029365 A | 3/2007 |
| KR | 10-2007-0104149 A | 10/2007 |
| KR | 10-2008-0070214 A | 7/2008 |
| KR | 10-2008-0078210 A | 8/2008 |
| KR | 10-2009-0022350 A | 3/2009 |
| KR | 10-2009-0040673 A | 4/2009 |
| KR | 10-2009-0109766 A | 10/2009 |
| WO | WO 2009/017067 | 2/2009 |
| WO | WO 2010/038516 | 4/2010 |

OTHER PUBLICATIONS

PCT Search Report and Written Opinion dated Jun. 23, 2010.
Korean Office Action dated Feb. 22, 2010.
PCT International Search Report dated Oct. 27, 2010 issued in Application No. PCT/KR2010/001492.
PCT International Search Report dated Oct. 29, 2010 issued in Application No. PCT/KR2010/001485.
Korean Office Action dated Dec. 21, 2010 issued in Application No. 10-2008-0049146.
Korean Office Action dated Dec. 21, 2010 issued in Application No. 10-2008-0099569.
PCT International Search Report dated Sep. 30, 2010 issued in Application No. PCT/KR2010/001067.
PCT International Search Report dated Sep. 30, 2010 issued in Application No. PCT/KR2010/001420.
Search Report dated Oct. 28, 2010 for Application No. PCT/KR2010/010422.
Search Report dated Oct. 28, 2010 for Application No. PCT/KR2010/010423.
Search Report dated Oct. 28, 2010 for Application No. PCT/KR2010/010424.
Search Report dated Oct. 28, 2010 for Application No. PCT/KR2010/010425.
Korean Office Action dated Apr. 9, 2010 for Application No. 10-2009-0113708.
Korean Office Action dated Oct. 11, 2010 for Application No. 10-2009-0053260.
International Search Report dated Oct. 27, 2010 for Application No. PCT/KR2010/001963.
Office Action dated Nov. 3, 2011 for U.S. Appl. No. 12/453,885.
Office Action dated May 25, 2011 from U.S. Application 12/453,885.
European Search Report for Application 10015492.1 dated Apr. 26, 2011.
Korean Notice of Allowance dated Aug. 30, 2011 for Application No. 10-2008-0049146 (English translation).
European Search Report dated Aug. 30, 2011 for Application No. 09 75 5013.
U.S. Office Action dated Oct. 25, 2011 for U.S. Appl. No. 12/727,966.
Korean Notice of Allowance for Application No. 10-2008-0049146 dated Nov. 30, 2011 and English translation.

* cited by examiner

BACKLIGHT UNIT HAVING LIGHT GUIDE PLATES

CROSS REFERENCE TO RELATED APPLICATION

This application is a continuation application of U.S. patent application Ser. No. 12/453,885, filed May 26, 2009, which claims priority and benefit of Korean Patent Application No. 10-2008-0049146, filed May 27, 2008, Korean Patent Application No. 10-2008-0061487, filed Jun. 27, 2008, Korean Patent Application No. 10-2008-0099569, filed Oct. 10, 2008, and Korean Patent Application No. 10-2009-0035029, filed Apr. 22, 2009, the subject matters of which are hereby incorporated by reference.

BACKGROUND

1. Field

The present invention relates to an LED back-light unit and a liquid crystal display device using the same.

2. Background

In general, of display devices, LCD (Liquid Crystal Display Device) has various applications, starting from television sets, to laptop computers, monitors for desk top computers, and cellular phones.

Since the LCD can not emit a light for itself, in order to display image information, a light emitting device is required for illumination of a liquid crystal display panel.

Since the light emitting device for the LCD is coupled to a back side of the liquid crystal display panel, the light emitting device is called as a back-light unit that forms a facial light source for providing a light to the liquid crystal display panel.

A general back-light unit is provided with a light source, a light plate, diffusion sheets, a prism, a protective sheet, and so on. As the light source, fluorescent lamps, such as mercury cold cathode fluorescent lamps, light emitting diodes, or the like can be used.

SUMMARY OF THE DISCLOSURE

The present invention relates to an LED back-light unit. The present invention further relates to a liquid crystal display device using the same.

In one embodiment, an LED back-light unit includes a light guide portion that includes a light guide plate and a reflection plate coupled to the light guide plate, wherein the light guide plate has a light input part and a first connection part, and wherein the reflection plate has a second connection part connected to the first connection part, and a light source including at least one light emitting diode, the light source emitting light toward the light guide portion.

In another embodiment, a modular LED back-light unit includes a plurality of adjacent light guide portions, wherein each of the light guide portions includes a light guide plate having a light input part and a first connection part, and a reflection plate coupled to the light guide plate, the reflection plate having a second connection part connected to the first connection part, and a light source including at least one light emitting diode, the light source emitting light toward the light guide portion.

In one embodiment, a liquid crystal display device includes a liquid crystal display panel and a back-light unit, wherein the back-light unit includes, a plurality of adjacent light guide portions, wherein each of the light guide portions includes a light guide plate having a light input part and a first connection part, and a reflection plate coupled to the light guide plate, the reflection plate having a second connection part connected to the first connection part, and a light source including at least one light emitting diode, the light source emitting light toward the light guide portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
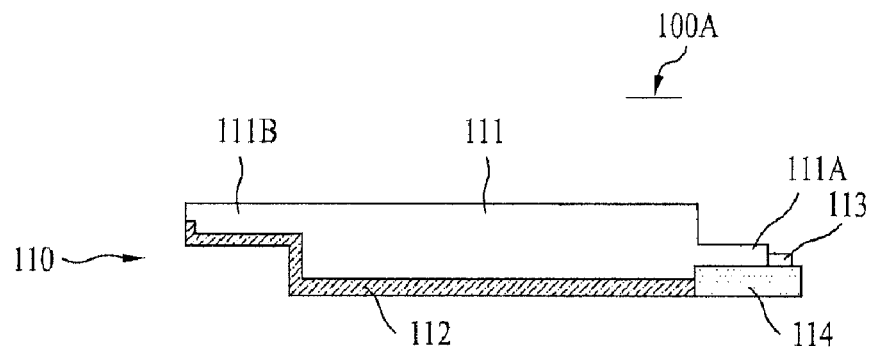
FIG. 1 illustrates a side view of a back-light unit in accordance with a first preferred embodiment of the present invention, schematically.

Reference will now be made in detail to the specific embodiments of the present invention, examples of which are illustrated in the accompanying drawings. Wherever possible, the same reference numbers will be used throughout the drawings to refer to the same or like parts.

The terms "module", "portion", and "part" on elements of the present invention used in description hereafter are ones given or used together with others only taking easiness of writing the specification into account, and are not distinctive in definitions between themselves, or in functions.

Though the present invention has variations and modifications, specific embodiment thereof will be illustrated with drawings. However, the present invention is not intended to limit the present invention to a specific one disclosed herein, and contrary to this, the present invention includes all modifications, substitutions, equivalences thereof in agreement of the aspect of the present invention defined by the claims of the present invention.

In a case it is described that an element, like a layer, a region, or a substrate, is "on" other element, it is understandable that the element is on the other element directly, or there may be another intermediate element between the two elements.

It will be understood that the words intend to include other directions in addition to a direction described in the drawings. Finally, the word of 'directly' means that there is no other element disposed inbetween. The words of 'and/or' as is used herein include one or more than one or all combinations of written items.

It will be also understood that although the terms first, second, and so forth are used herein to describe various regions, layers and/or sections, these regions, layers and/or sections should not be limited by these terms.

A First Embodiment

Figure 2:
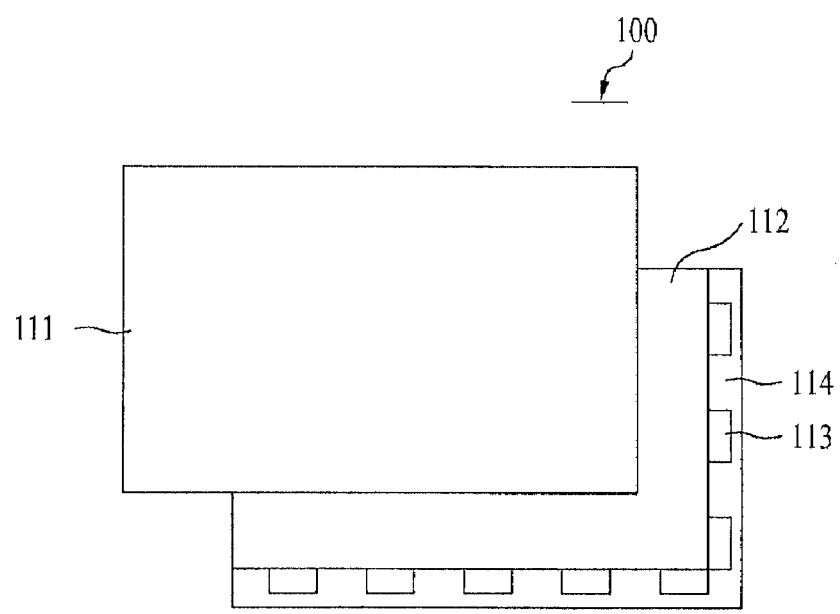
FIG. 2 illustrates an exploded view of the back-light unit in FIG. 1.

FIG. 1 illustrates a side view of a back-light unit in accordance with a first preferred embodiment of the present invention schematically, and FIG. 2 illustrates an exploded view of the back-light unit in FIG. 1.

Referring to FIGS. 1 and 2, the back-light unit 100A includes a light guide plate 111, a reflection plate 112 on an underside of the light guide plate 111, and a light source 113. The light guide plate 111 and the reflection plate 112 together may be called as a light guide portion 110 or a light guide plate module 110.

As for the light source 113, light emitting diodes (LEDs) may be used, the light guide plate 111 includes a light input part 111A formed at a portion of the light guide plate 111 where a light is incident thereto from the LED 113, and the other side (opposite to the light input part 111A) edge 111B which is stepped.

Referring to FIGS. 1 and 2, the light input part 111A is projected from the light guide plate 111 in a side direction, and, if the light input part 111A is projected from the light guide plate 111 in the side direction thus, the LEDs 113 can be arranged at an edge of the light input part 111A on the circuit board 114.

The reflection plate 112 on the light guide plate 111 is on the underside of the light guide plate 111 and an underside of the other edge 111B of the light input part 111A. In addition to this, the reflection plate 112 may cover sides of the light guide plate 111.

The LED 113 and the circuit board 114 may be positioned on a first side which is a light input part 111A side of the light guide plate 111, or on the first side and a second side which is substantially perpendicular to the first side such that the light is incident to the light guide plate 111 from the LED 113 in two directions.

Figure 3:
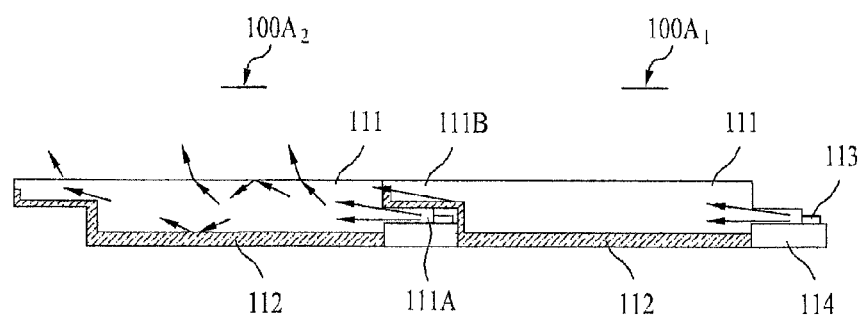
FIG. 3 illustrates a side view of an assembly of a back-light unit in accordance with a first preferred embodiment of the present invention, schematically.
Figure 4:
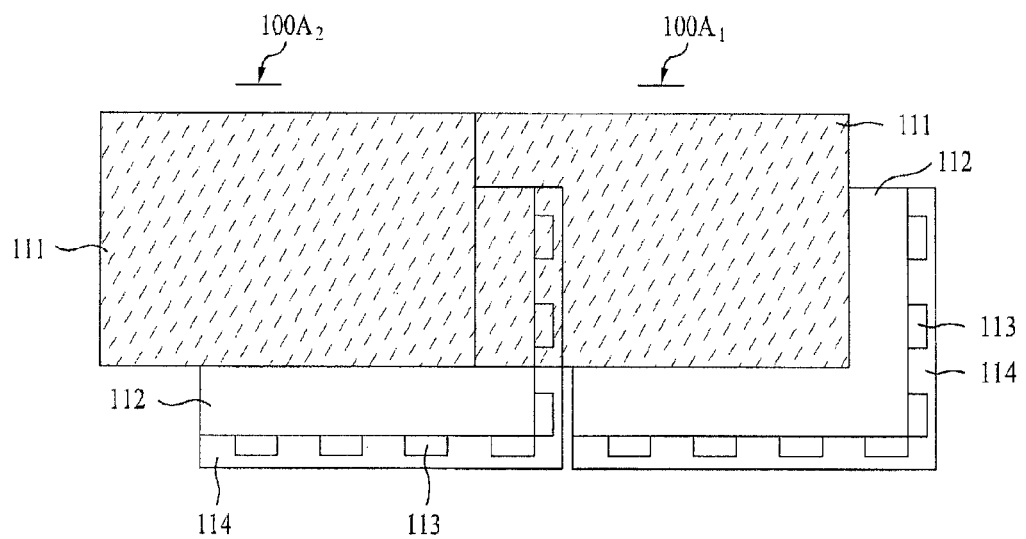
FIG. 4 illustrates an exploded view of the assembly of the back-light unit in FIG. 3.

A plurality of the light guide portions 110 each including the light guide plate 111 and the reflection plate 112 shown in FIGS. 1 and 2 may be arranged as shown in FIGS. 3 and 4 to form a full set of a back-light unit $100A_1$ or $100A_2$.

For convenience's sake, referring to FIGS. 3 and 4, a right side back-light unit 100A will be called as a first module $A_1$, and a left side back-light unit 100A will be called as a second module $A_2$.

Referring to FIGS. 3 and 4, the first module $100A_1$ and the second module $100A_2$ are coupled such that the other edge 111B opposite to the light input part of the first module $A_1$ covers the light input part 111A of the second module $A_2$.

This is for preventing the light from the LED 113 at the light input part 111A of the first module $100A_1$ from leaking to an outside of the back-light unit.

By arranging the other edge 111B of the first module $100A_1$ coupled to the light input part 111A of the second module $100A_2$, a function of the light guide plate 111 as well as a function of covering the LED 113 of the second module $100A_2$ can be performed. That is, the light from the LED 113 of the second module $100A_2$ is not exposed, directly.

Owing to above configuration, the light from the second module $100A_2$ advances along a side of the light guide plate 111 of the second module $A_2$, and comes out of an outside surface of the light guide plate 111 uniformly.

The reflection plate 112 of the second module $100A_2$ can improve light efficiency of the light comes out of the outside surface of the light guide plate 111 thus. That is, the light from the LED 113 of the second module $A_2$ advances along the side of the light guide plate 111A, and the reflection plate 112 of the first module $100A_1$ over the light input part 111A adjacent to the light input part 111A assists such advance of the light.

By arranging the back-light units 100A each having the light guide plate 111 and the reflection plate 112 of the first embodiment in a tiling fashion, a large sized back-light unit 100A can be fabricated, which can be used in TV sets, sign boards with lamps, and so on.

Thus, by projecting the light input part 111A from a light forwarding surface extensively, relatively dark portions shown on a portion caused by gaps between each of the LEDs 113 can be decreased, and direct leakage of the light from the LEDs 113 through connected portion between each of the light guide plates 111 can be prevented or substantially reduced.

Though the light can transmit from one light guide plate 111 to an adjacent light guide plate 111 through the other edge 111B of the light input part 111A, by not placing the reflection plate 112 between the adjacent light guide plates 111 to shield the light transmission completely, but by permitting the light to transmit through the adjacent light guide plates 111, formation of the relatively dark portions (shadow images) caused by a step between the light input part 111A and the adjacent edge 111B of the light guide plate 111 can be prevented or substantially reduced.

Figure 5:
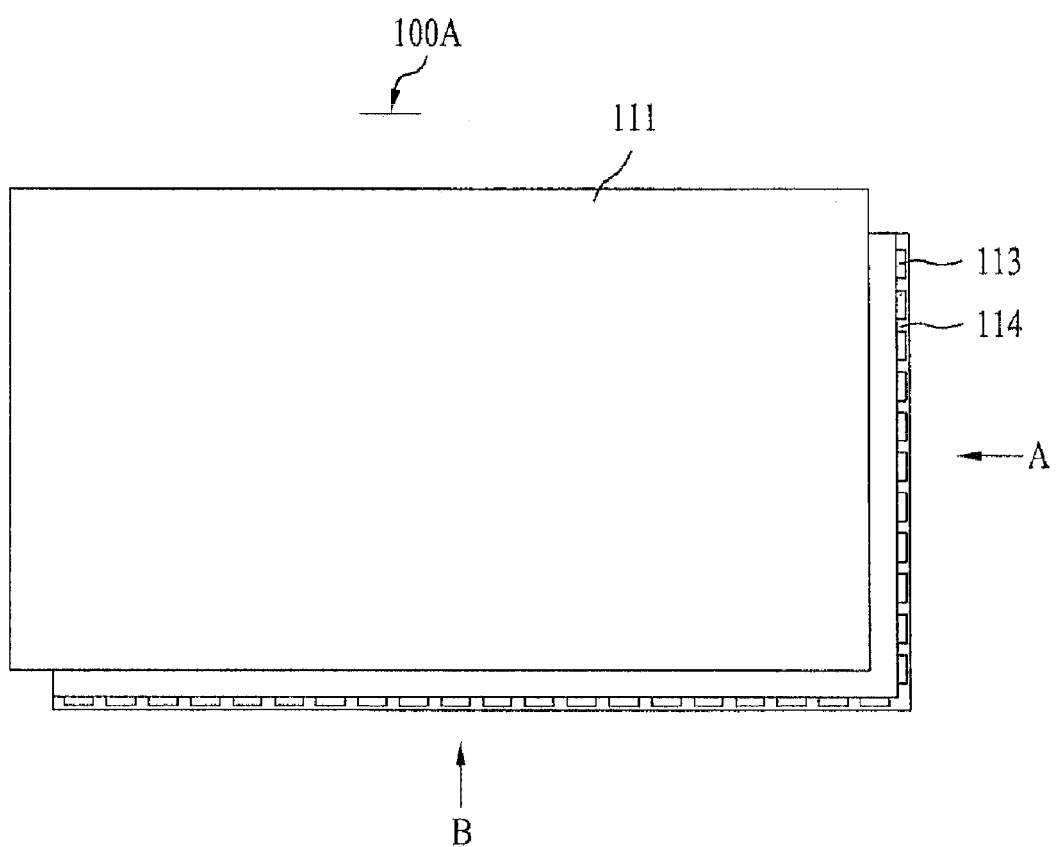
FIG. 5 illustrates an exploded view of a back-light unit in accordance with a first preferred embodiment of the present invention.
Figure 6:
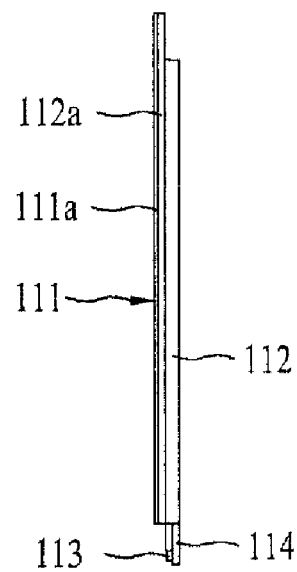
FIG. 6 illustrates a side view of the back-light unit in FIG. 5 seen from A.
Figure 7:
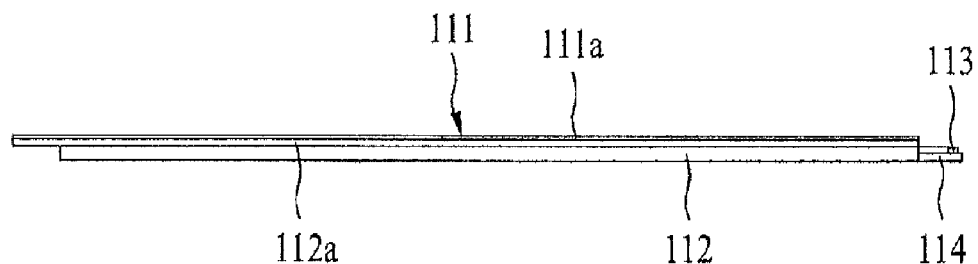
FIG. 7 illustrates a side view of the back-light unit in FIG. 5 seen from B.

FIGS. 5 to 7 illustrate the back-light unit in more detail, each showing a state in which the LED 113 on the circuit board 114 is in contact with the light guide plate 111.

Figure 8:
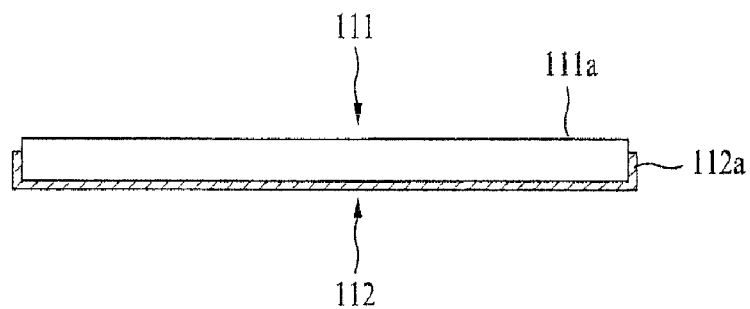
FIG. 8 illustrates a section of a light guide portion.

Referring to FIGS. 6 and 7, the reflection plate 112 is arranged, not only on an underside of the light guide plate 111, but also on sides of light guide plate 111 as a rim 112a of the reflection plate 112 such that a portion of the light guide plate 111 is exposed and rest of the light guide plate 111 is covered by the rim 112a. That is, a section as shown in FIG. 8 is made.

Or, depending on cases, the reflection plate 112 may be folded at the sides of the light guide plate 111 more than one time.

Figure 9:
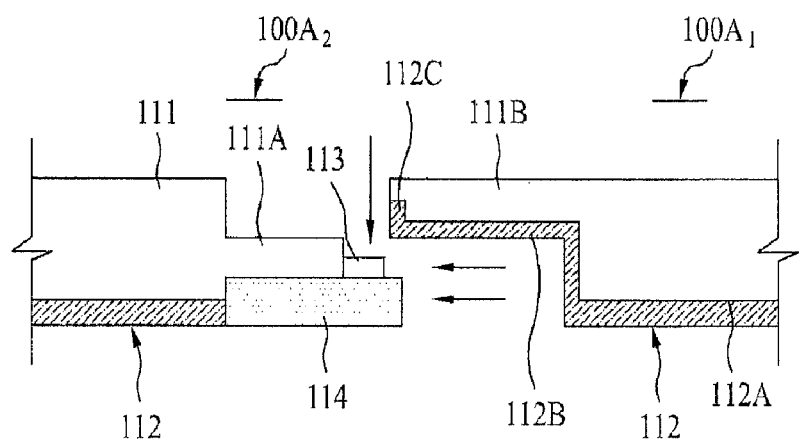
FIGS. 9 and 10 illustrate steps of coupling of a light guide portion in accordance with a first preferred embodiment of the present invention, schematically.
Figure 10:
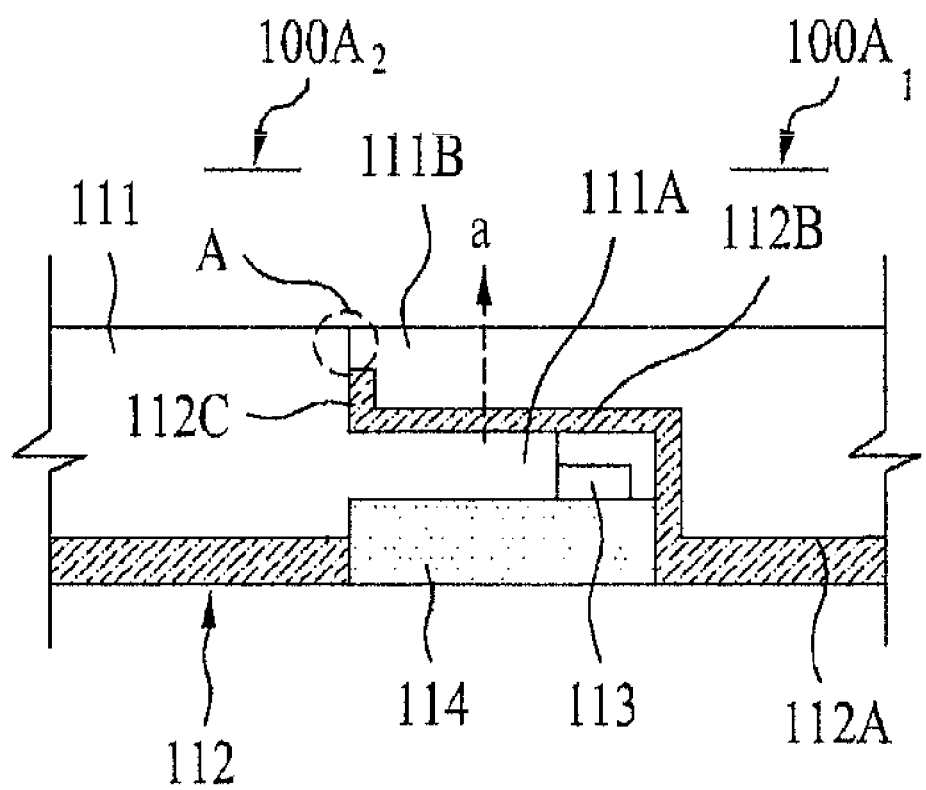

Coupling to the modules $100A_1$ and $100A_2$ can be made as shown in FIGS. 9 and 10.

That is, in a state the LED 113 of the second module $A_2$ is coupled to the light input part 111A of the light guide plate 111 with the LED 113 in contact with the light input part 111A, the edge 111B of the first module $A_1$ is coupled to the light input part 111A of the second module $A_2$ adjacent thereto.

According to this, the edge 111B of the first module $100A_1$ having the reflection plate 112 attached thereto is positioned over the LED 113 of the second module $A_2$, such that the light from the LED 113 of the second module $A_2$ is not exposed to an upper side, but incident on the light input part 111A, transmits through the light guide plate 111 and comes out of the light guide plate 111.

In this instance, the reflection plate 112B on the underside of the other edge of the light input part 111A and an edge 112C of the reflection plate 112B extended therefrom can shield at least a portion of the light guide plate 111, optically.

In other words, though the first module $A_1$ and the second module $A_2$ are coupled together optically, enabling the light to transmit from the second module $100A_2$ to the first module $A_1$, and vice versa, a portion of the light can be shielded.

That is, a portion of the light from the second module $A_2$ to the edge 111B of the first module $A_1$ can be shielded by the edge 112c of the reflection plate of the first module $100A_1$, at least preventing a brighter line from forming at a boundary of the modules $A_1$ and $A_2$. However, adjacent modules are made to be connected with a connection portion A over the edge 112c of the reflection plate optically, formation of a relatively dark line can be prevented or decreased.

Figure 11:
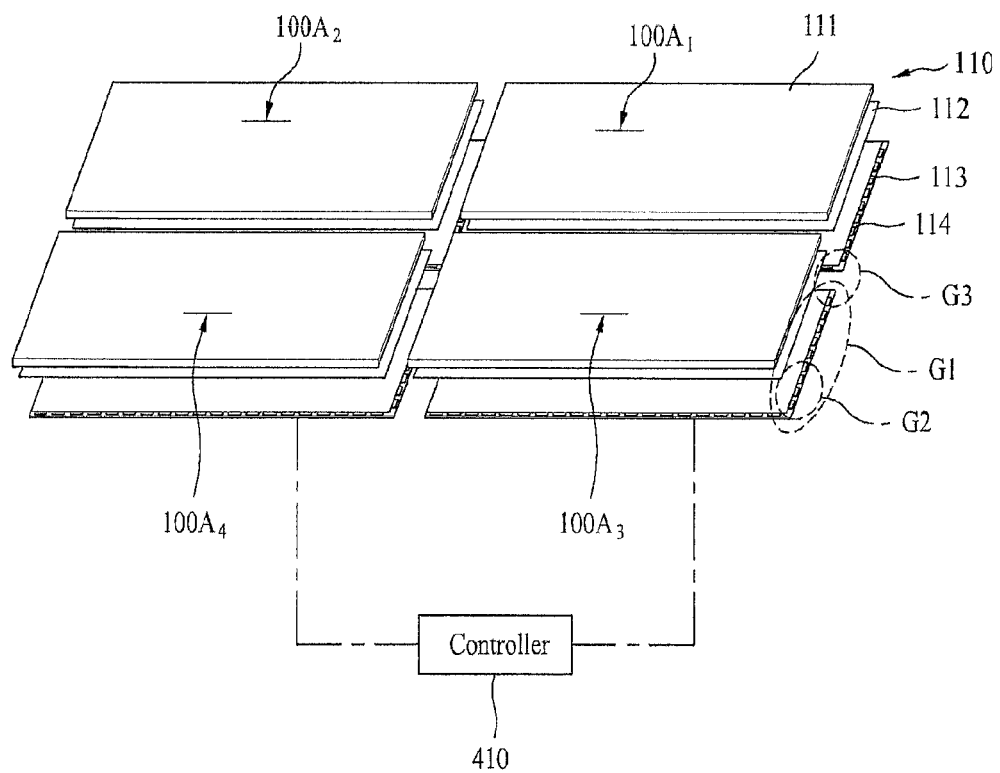
FIG. 11 illustrates an exploded perspective view showing coupling of back-light unit modules in accordance with a first preferred embodiment of the present invention.

Referring to FIG. 11, by arranging a plurality of the modules $100A_1$, $100A_2$, $100A_3$, and $100A_4$ each having the light guide plate 111 and the reflection plate 112, a set of a back-light unit 100A can be fabricated.

The circuit board 114 and the LEDs 113 are arranged on one or two sides of the light guide portion 110, and a plurality of the modules $100A_1$, $100A_2$, $100A_3$, and $100A_4$ each having the light guide plate 111 and the reflection plate 112, to fabricate a set of a back-light unit 100A.

The back-light unit 100A having the plurality of the modules $100A_1$, $100A_2$, $100A_3$, and $100A_4$ or the plurality of the LEDs connected thereto may be driven by a controller 410 independently or in groups with the back-light unit 100A divided into groups of predefined number of LEDs depending on cases, enabling to reduce power consumption, significantly.

That is, the controller 410 independently controls the brightness of the light source (LEDs) 113 of each of the light guide portions 110.

The brightness of the light source 113 of each of the light guide portions 110 is controlled according to image data associated with the light source 113. The image data is in relation to images displayed on a display panel, such as a liquid crystal display panel. For example, if the image data has dark images, a group of light source 113 in relation to the dark images can be turned out or dimmed, and if the image data has bright images, a group of light source 113 in relation to the bright images can be driving more brightly. As a result, the contrast ratio of the images is increased or improved.

In this instance, the unit of driving by the controller 410 may be a set of all LEDs in an individual module, an individual LED, or a set of LEDs grouped within each of the module (logical group).

That is, the LEDs may be driven as a unit of a group of all LEDs set G1 located along a side of each module, or as a unit of a sub group of LED set G2 within the set G1. In some case, the unit can be a logical group G3 (as a unit of driving) which comprises LEDs (or an LED) located in a module $100A_1$ and LEDs (or an LED) located in the adjacent module $100A_2$.

In other words, the light source 113 of the light guide portion 110 includes groups (G1, G2, or G3) of LEDs, and the controller 410 independently controls brightness of each group of the LEDs 113.

Thus, as described, in the back-light unit in accordance with the first embodiment of the present invention, small sized light guide plates are formed, and the LEDs are attached to a side of each of the light guide plates, for securing a light quantity and dispersing heat, and particularly, LEDs at the side of the light guide plate can be hidden, optically.

Moreover, the back-light unit in accordance with the first embodiment of the present invention permits to arrange the LEDs between the light guide plates as an entire area of the display can be covered with the small sized light guide plate modules, and to use the same light guide plate regardless of a size of the display.

In the meantime, fabrication of the large sized display by connecting the light guide plates fabricated as modules piece by piece in a tiling fashion enables to standardize parts since the same part can be applied to various sized TV sets by varying a number of modules only.

A Second Embodiment

Figure 12:
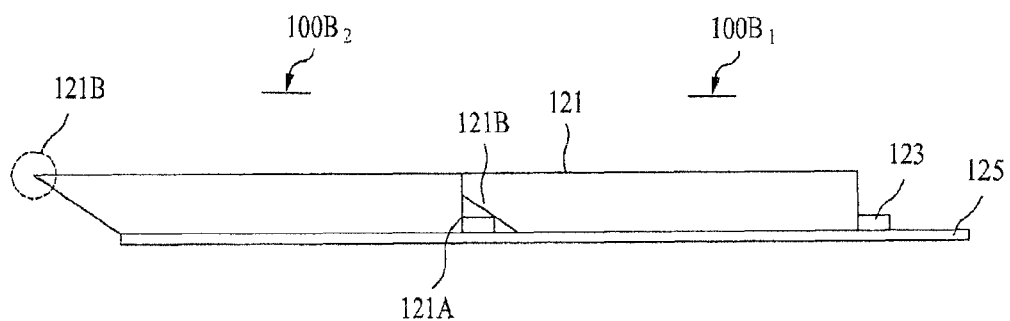
FIG. 12 illustrates a side view of a back-light unit in accordance with a second preferred embodiment of the present invention, schematically.

Referring to FIG. 12, the back-light unit 100B in accordance with a second preferred embodiment of the present invention includes a light guide plate 121, a back panel (or a frame) 125 under the light guide plate 121 and a light source 123.

A plurality of modules $100B_1$ and $100B_2$ each having the light guide plate 121 of the second embodiment are arranged on a plane to form a full set of the back-light unit 100B.

For convenience's sake, a right side module 100B will be called as a first module $100B_1$, and a left side module 100B will be called as a second module $100B_2$.

That is, a back light portion 121B of the light guide plate 121 of the first module $100B_1$ is coupled to a light input part 121A of the second module $100B_2$ adjacent thereto in a position of covering the light input part 121A. This is for preventing the light from the LED 123 at the light input part 121A of the second module $100B_2$ adjacent thereto from leaking to an outside of the back-light unit.

In order to connect the light guide plate 121 of the first module $100B_1$ and light guide plate 121 of the second module $100B_2$ adjacent thereto in a tiling fashion, the LED 123 is located on a lower side of a connection portion, i.e., on a lower side of an edge 121B of the light guide plate 121.

Therefore, it is provided to secure a space for placing the LED 123, which may be selected according to optical characteristics of a structure of the light guide plate 121.

That is, referring to FIG. 12, different from the first embodiment, the edge 121B of the light guide plate 121 is triangular, and the LED 123 may be placed on the lower side of the edge 121B. In this instance, instead of a separate circuit board, the light guide plate 121 and the LED 123 may be mounted to one frame 125 having circuits formed thereon.

Parts not explained herein may be identical to the first embodiment.

A Third Embodiment

Figure 13:
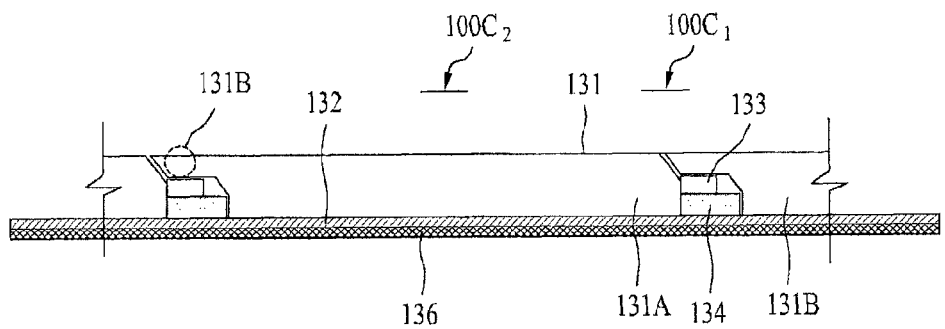
FIG. 13 illustrates a side view of a back-light unit in accordance with a third preferred embodiment of the present invention, schematically.

Referring to FIG. 13, a back-light unit 100D in accordance with a third preferred embodiment of the present invention includes a light source portion 130 having a light guide plate 131 and a reflection plate 132 on an underside of the light guide plate 131, a light source 133, and a circuit board 134 having the light source 133 mounted thereto.

Referring to FIG. 13, there are a plurality of modules 100C₁ and 100C₂ each having the light guide plate 131 arranged on a plane to form a full set of a back-light unit 100C.

Referring to FIG. 13, for convenience's sake, a right side back-light unit 100C will be called as a first back-light unit 100C₁ and a left side back-light unit 100C will be called as a second back-light unit 100C₂.

In order to connect the light guide plate 131 of the first back-light unit 100C₁ to the light guide plate 131 of the second module 100C₂ in a tiling fashion, the LED 133 is located on a lower side of a connection portion, i.e., on a lower side of the edge 131B.

According to this, it is provided to secure a space for placing the LED 133 therein, by selecting the space according to optical characteristic of a structure of the light guide plate 131.

The structure may have a sloped back light portion 131B of the first module 100C₁ in contact with the second module C₂. In this instance, the LED 133 is mounted to a separate circuit board, and the reflection plate 132 and the frame 136 may be positioned under the light guide plate 131.

A Fourth Embodiment

Referring to FIGS. 14 to 17, the back-light unit 100D in accordance with a fourth preferred embodiment of the present invention includes a light guide plate 141, a light source 143, and a reflection plate 144. Parts unexplained herein may have things identical to foregoing embodiments applied thereto.

The light guide plate 141 and the reflection plate 144 together may be called as a light guide portion 140 or a light guide plate module 140.

The light guide plate 141 has a flat upper side, a sloped lower surface, and a side having a light input part 142 formed thereon.

The light guide plate 141 has opposite first side 141a and a second side 141b, and opposite third side 141c and fourth side 141d. The third side 141c and the fourth side 141d are sides substantially perpendicular to the light input part 142. The light guide plate 141 has an underside surface 141f spaced from or in contact with a light forwarding surface 141e and the reflection plate 144.

The light guide plate 141 has a thickness which becomes the thinner as the thickness goes from the first side 141a to the second side 141b the more, forming the underside of the light guide plate 141 to be sloped, partially or entirely.

The light input part 142 at the first side 141a of the light guide plate 141 may have a thickness thinner than a thickness of the first side 141a of the light guide plate 141. According to this, an upper side of the light input part 142 and an upper side 141e of the light guide plate 141 are positioned on planes different from each other.

Depending on cases, in order to transmit the light sufficiently uniformly throughout the light guide plate 141, a portion of a lower side of the light input part 142 may be formed unevenly.

An upper side of the circuit board 143b of the light source 143 coupled to the underside of the light input part 142 may also be formed unevenly at the same position.

The reflection plate 144 has a rim 147 substantially perpendicular to the light source 143, which may be coupled to at least a portion of the third side 141c and the fourth side 141d of the light guide plate 141.

The light guide plate 141 may have at least one fastening protrusion 145 protruding from an underside periphery as a fastening member for fastening to an upper side 144a of the reflection plate 144.

The fastening protrusion 145 is placed in a fastening recess 144e in the upper side of the reflection plate 144 for maintaining a position even against an external impact or vibration.

As a member for fastening the light guide plate 141 to the reflection plate 144, the light guide plate 141 may have a supplementary (or auxiliary) protrusion 145a from the second side 141b and the reflection plate 144 may have a cut-off portion 144g formed in conformity with the supplementary protrusion 145a.

In the meantime, the light source 143, positioned at a side of the light input part 142 for emitting a light to the light input part 142, may include at least one LED 143a and a circuit board 143b.

The LED 143a is positioned at a side of the light input part 142 for generating and emitting the light to the light input part 142. The circuit board 143b may be coupled to and support undersides of the LED 143a and the light input part 142.

Thus, by projecting the light input part 142 from the side of the light guide plate 141, relatively dark portions between the LEDs 143a can be eliminated or decreased, and direct leakage of the light through connection portion between modules 100D can be prevented.

The reflection plate 144 is coupled to the underside 141f of the light guide plate 141 for reflection of the light to the light guide plate 141, and may cover at least a portion of the second to fourth sides 141b, 141c, and 141d of the light guide plate 141 for preventing the light from transmitting to an outside of the back-light unit or an adjacent light guide plate from the light guide plate 141 at least partially.

Figure 16:
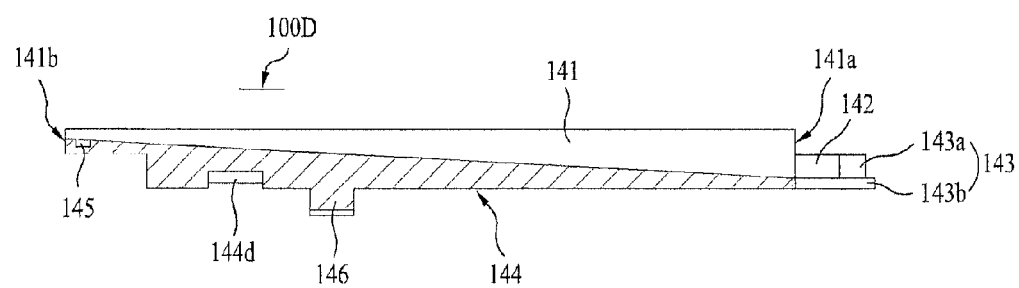
Figure 17:
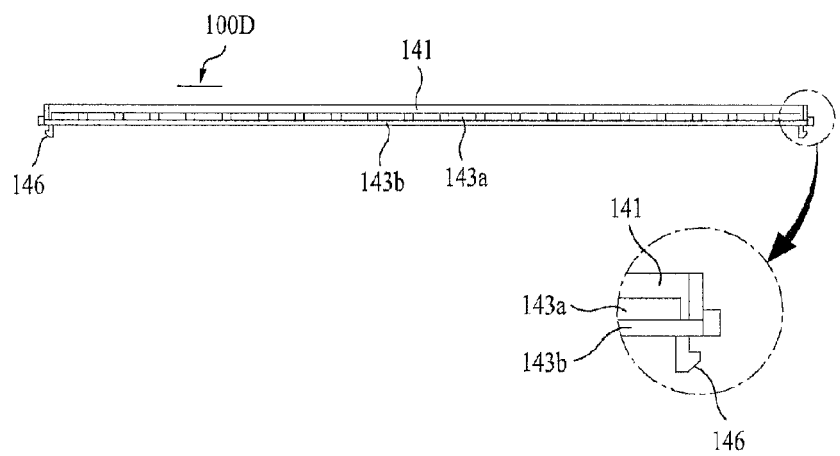

Referring to FIG. 16, an upper side 144a of the reflection plate 144 has a slope opposite to the slope of the underside 141f of the light guide plate 141.

Accordingly, if the reflection plate 144 is placed on the light guide plate 141 such that the upper side 144a of the reflection plate 144 couples to the underside 141f of the light guide plate 141, the underside of the reflection plate 144 and the upper side 141e of the light guide plate 141 are parallel to each other.

That is, the reflection plate 144 has opposite first and second sides, and has a thickness which becomes the thicker as the thickness goes from the first side to the second side the more.

The light source 143 is positioned at the first side of the reflection plate 144, and a cover projection 144c is formed at the second side of the reflection plate 144 for accommodating and covering the light source 143.

The cover projection 144c receives the light source 143 to cover an upper side of the light source 143 of an adjacent module when a plurality of the back-light unit modules are assembled, and may prevent the LED 143*a* at the light input projection 142 of the light guide plate 141 from showing on a display screen.

As described before, the reflection plate 144 has a rim 147 substantially perpendicular to the light source 143, which may be coupled to at least a portion of the third side 141*c* and the fourth side 141*d* of the light guide plate 141, for at least partially preventing the light from transmitting to an adjacent light guide portion 140 from the light guide plate 141 through the third side 141*c* and the fourth side 141*d* of the light guide plate 141.

Moreover, if a plurality of the light guide portions 130 or the back-light unit modules are assembled by making the back-light units as modules, the modules can be coupled together as a side hook recess 144*d* in the reflection plate 144 is placed on a side hook 148 (See FIG. 15) of adjacent module, and the side hook 148 of the reflection plate 144 is placed in the side hook recess 144*d* in adjacent module.

The side hook 148 and the side hook recess 144*d* enable easy alignment and assembly of the plurality of modules in a first direction, for example, a transverse (or longitudinal, as seen from the other side) direction.

As a fastening member for fastening the frame (not shown) of the back-light unit, the reflection plate 144 has at least one underside hook 146 at an underside periphery for coupling to the frame (not shown).

The underside hook 146 enables easy fastening of the light guide plate module to the frame without screws.

Figure 14:
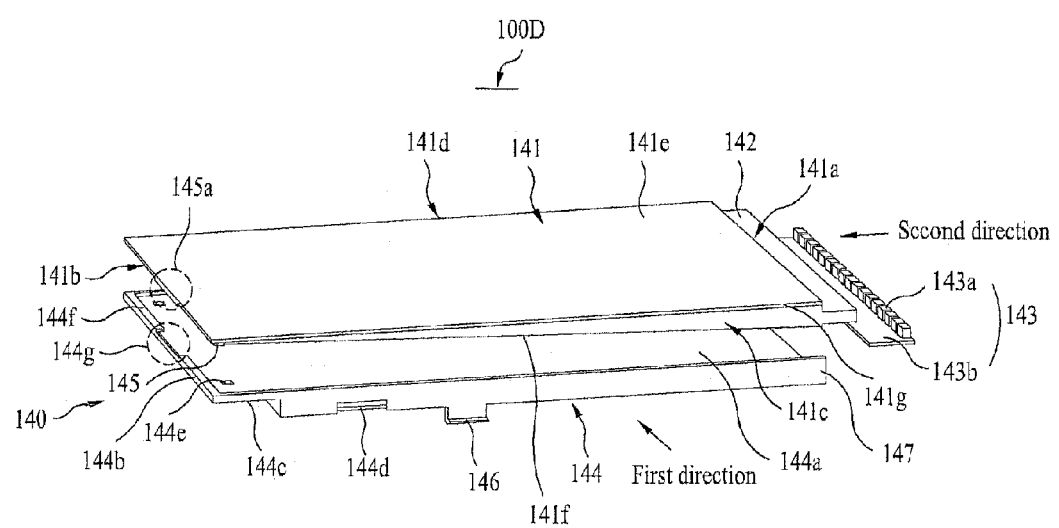
FIGS. 14~21 illustrate diagrams each showing a structure of a back-light unit in accordance with a fourth preferred embodiment of the present invention.
Figure 15:
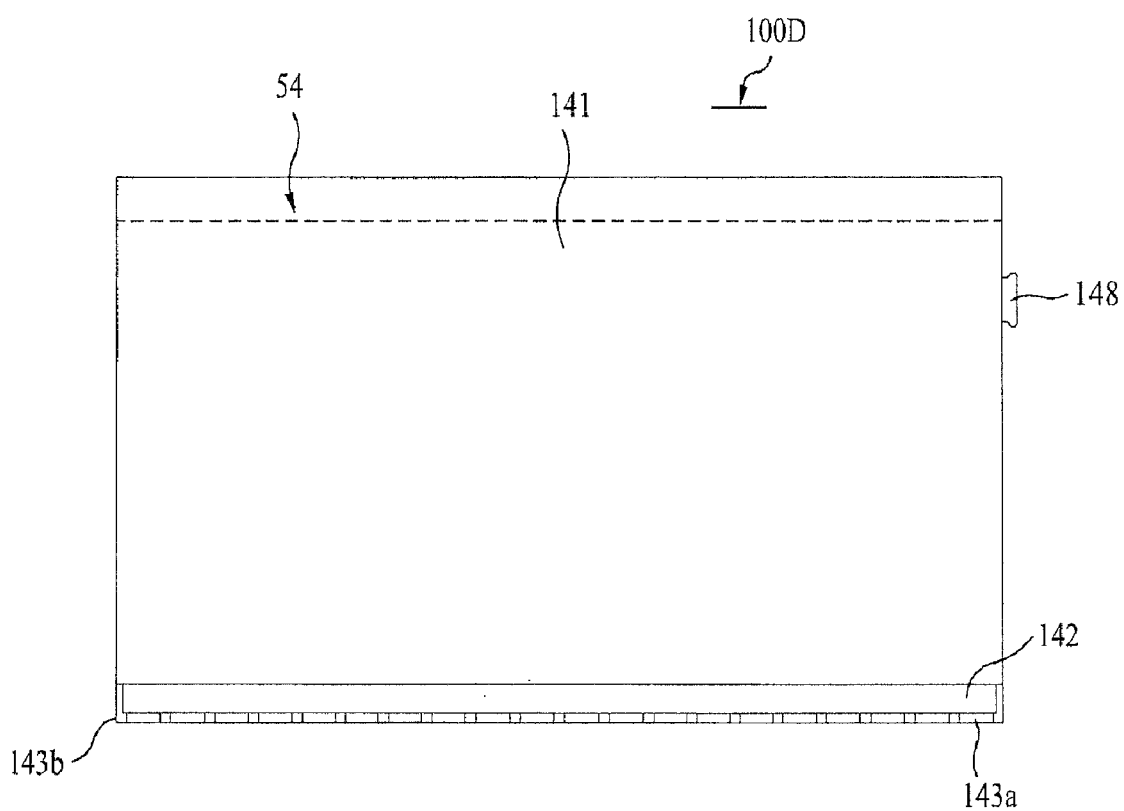
Figure 18:
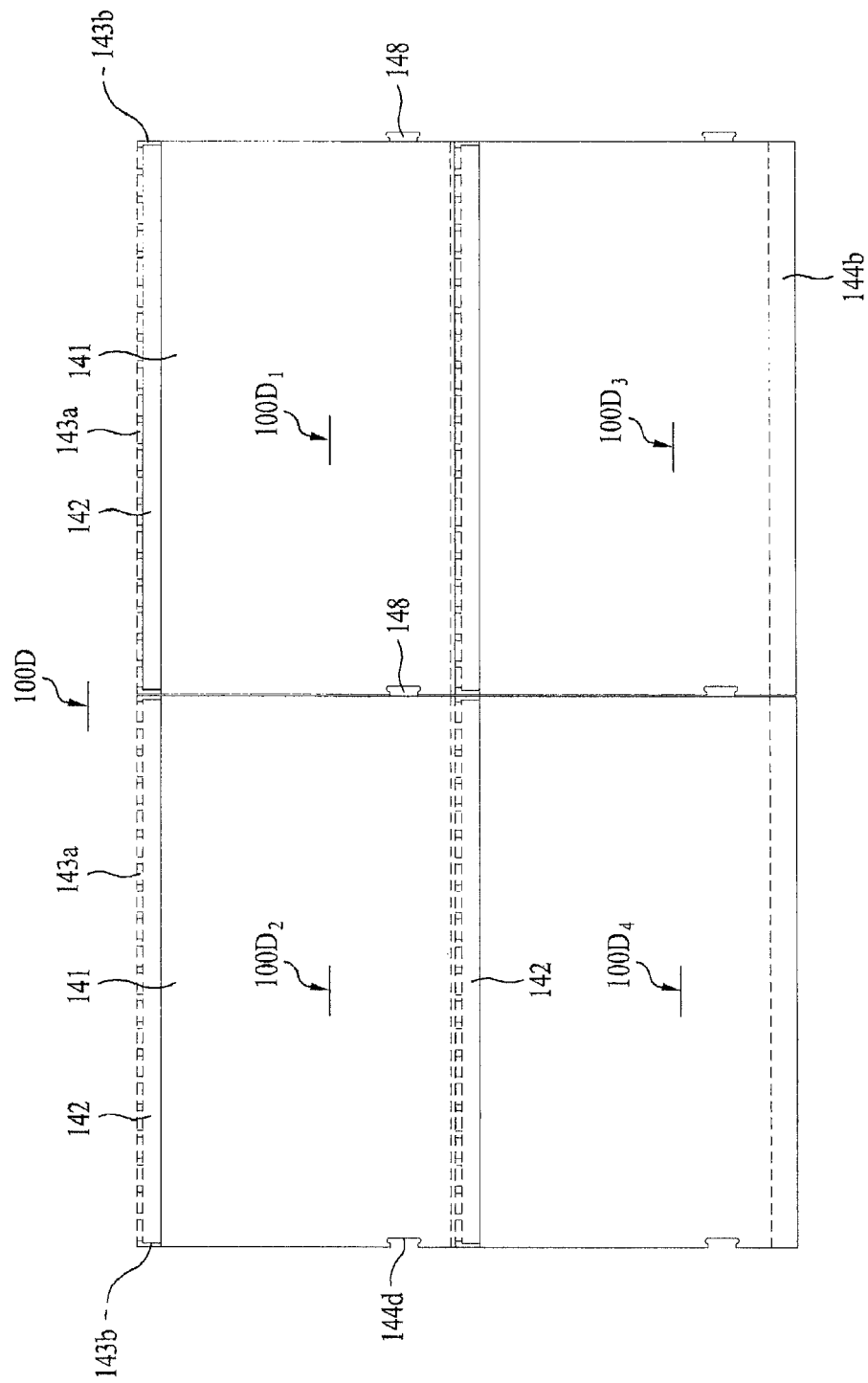

FIG. 18 illustrates a plan view of a large sized back-light unit that is an assembly of a plurality of the back-light unit modules in FIG. 14.

Thus, after fabricating the back-light units as a module, the side hook 148 of a first module 100D$_1$ is placed in the side hook recess 144*d* of the second module adjacent thereto, to couple the first and second modules together.

Thus, by connecting other back-light unit modules to left and right sides of one back-light module, a plurality of modules can be fastened in a first direction (transverse direction; See FIG. 14.) on a plane.

Figure 19:
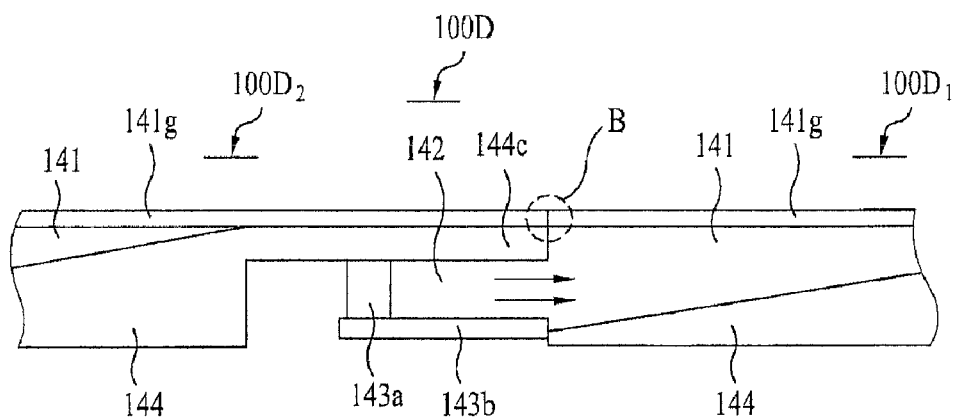

Referring to FIG. 19, modules to be coupled in a second direction (a longitudinal direction; See FIG. 14.) are coupled such that the cover projection 144*c* of the reflection plate 144 of each of the modules covers the upper side of the LED 143*a* of the back-light unit module adjacent thereto.

In this instance, at least some of boundaries between the modules (FIG. 19 illustrates a longitudinal direction boundary) may be made to couple a portion of the light optically. That is, portions of a light input part 142 side of the first module 100D$_1$ and an edge side of the second module 100D$_2$ can be made to be at least partially shielded by the cover projection 144*c* of the reflection plate 144, optically.

That is, the cover projection 144*c* of the reflection plate 144 is configured to reduce light from the corresponding module (the second module 100D$_2$) passing into an adjacent module (the first module 100D$_1$).

Therefore, a "B" portion of the boundary of the adjacent modules can be made to be coupled optically, and by adjusting a thickness of the cover projection 144*c* or a shape of the edge side, an extent of the optical coupling of the modules can be adjusted. Accordingly, the "B" portion is a light transmitting part enabling optical coupling with the adjacent modules.

By adjusting or regulating the extent of the optical coupling, formation of a bright line of which light is stronger than the light from the light output surface 141*e* of the light guide plate 141 or a relatively dark line of which light is weaker than the light from the light output surface 141*e* of the light guide plate 141 can be at least partially prevented. According to this, in case the back-light unit is fabricated by connecting the plurality of modules side by side, a substantially uniform light can be formed by decreasing optical singular point at the light forwarding surface or an interconnected part between adjacent modules.

Figure 20:
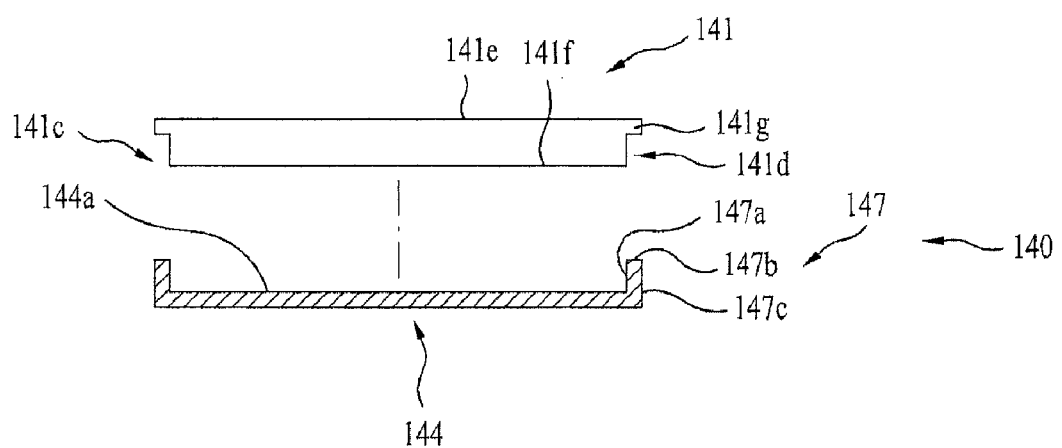
Figure 21:
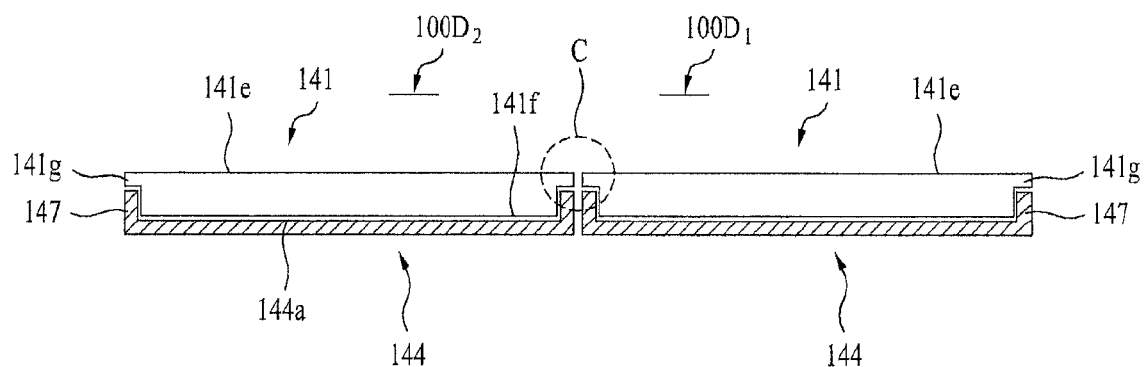

FIGS. 20 and 21 illustrate sections of coupling states of the light guide portions each having the light guide plate 141 and the reflection plate 144, and a transverse direction coupling state of the modules coupled side by side.

As described before, though most of area of the underside 141*f* of the light guide plate 141 couples to most of area of the upper side 144*a* of the reflection plate 144, the rim 147 of the reflection plate 144 couples to the third side 141*c* and the fourth side 141*d* of the light guide plate 141, when it can be made that a coupling projection 141*g* of the light guide plate 141 is positioned over the upper side 147*b* of the rim 147.

That is, the rim 147 may have an inner side 147*a*, an upper side 147*b* and an outer side 147*c*, wherein the inner side 147*a* couples to the third side 141*c* and the fourth side 141*d*, and the upper side 147*b* couples to the coupling projection 141*g*. The outer side 147*c* may be positioned to be in contact with the outer side 147*c* of an adjacent module.

Thus, of the boundaries between modules, a portion of the transverse direction boundary can also be coupled optically. In other words, the other portion of the transverse direction boundary can also be shielded optically by the rim 147 of the reflection plate 144.

Accordingly, a C portion of the boundary of the modules adjacent to each other can be made to be coupled optically, and by adjusting a height of the rim 147 or a thickness of the coupling projection 141*g*, the extent of the optical coupling of the modules can be adjusted. Accordingly, the C portion is another light transmitting part enabling optical coupling with the adjacent modules.

Such an adjusted optical coupling at the C portion may also enable to suppress the formation of the relatively bright line or the dark line at the light output surface of the entire back-light unit.

The plurality of back-light unit modules coupled in the transverse and longitudinal directions thus are suitable for using as a back-light unit of a large sized display device.

Since the assembly of the plurality of back-light unit modules is made to be easy according to the described structure, a production cost may be reduced.

Moreover, the fabrication of the back-light unit by using the light guide plate may enable to reduce a thickness of the back-light unit, leading to reduction of a total thickness of the display device.

A Fifth Embodiment

Referring to FIGS. 22 to 27, the back-light unit 100E in accordance with a fifth embodiment of the present invention includes a light guide plate 151, a light source 153, a reflection plate 154 and at least one space retaining part 157. The light guide plate 151 and the reflection plate 154 together may be called as a light guide portion 150 or a light guide plate module 150. Unexplained parts may have things identical to the foregoing embodiments applied thereto.

The light guide plate 151 has a flat upper side, and sloped underside, and a light input part 152 is projected from a portion of a side.

The light guide plate 151 has opposite first side 151*a* and a second side 151*b*, and opposite third side 151*c* and fourth side 151*d*.

The light guide plate 151 has a thickness which becomes the thinner as the thickness goes from the first side 151*a* to the second side 151b the more, forming the underside of the light guide plate 151 to be sloped, may be entirely.

The light input part 152 at the first side 151a of the light guide plate 151 may have a thickness thinner than a thickness of the first side 151a of the light guide plate 151.

According to this, an upper side of the light input part 152 and an upper side of the light guide plate 151 are positioned on planes different from each other.

Depending on cases, in order to transmit the light uniformly throughout the light guide plate 151, a portion of a lower side of the light input part 152 may be formed unevenly.

An upper side of the circuit board 153b of the light source 153 coupled to the underside of the light input part 152 may also be formed unevenly at the same position.

The light guide plate 151 may have at least one fastening protrusion 155 protruding from an underside periphery as a fastening member for coupling to coupling to the upper side of the reflection plate 154, additionally.

The fastening protrusion 155 is placed in a fastening recess 154a in the upper side of the reflection plate 154 for retaining a position even against an external impact or vibration.

The light guide plate 151 has at least one space retaining part 157 on an upper side.

Figure 27:
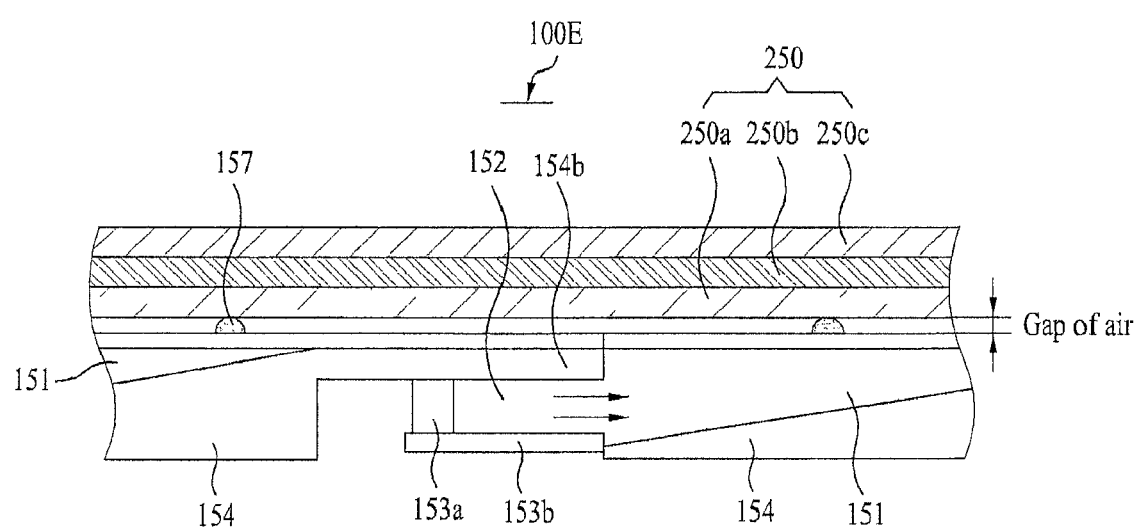

The space retaining part 157 is at least one protrusion, for supporting an optical sheet 250 shown in FIG. 27 to retain a gap of an air layer between the light guide plate 151 and the optical sheet 250.

Of the surfaces of the protrusion 157, a surface in contact with the light guide plate 151 is flat, and a surface in contact with a surface of the optical sheet 250 may be formed to be semi-circular to have a curvature.

It is preferable that a radius of the curvature of the protrusion 157 in contact with the surface of the optical sheet 250 is about 0.1~1 mm.

This is because a loss of the light due to reflection or refraction at the protrusion 157 may become larger if the radius of the curvature is below about 0.1 mm or over about 1 mm.

Therefore, it is favorable to fabricate the protrusion 157 by adjusting the curvature of the protrusion 157 appropriately such that the light incident onto the protrusion 157 is not lost, but proceeds in a direction of the optical sheet 250 as much as possible.

Moreover, it is beneficial that the protrusion 157 has a height "h" of about 1~2 mm, one of which reason is that, if the height "h" of the protrusion 157 is below about 1 mm, the gap of the air layer is too small for an incident light to diffuse, making effectiveness of the air layer gap poor, and if the height "h" of the protrusion 157 is over about 2 mm, a total thickness of the back-light unit 100E becomes thick, making effectiveness of the back-light unit poor.

It is beneficial that a distance "d" between adjacent protrusion 157 is about ⅓ of a distance from a light input surface (the light input part 152) to a light output surface (a light forwarding surface) of the light guide plate 151.

That is, it is beneficial that the distance "d" between adjacent protrusion 157 is about 2~3 cm. This is because, if the distance "d" between adjacent protrusion 157 is below about 2 mm, a number of the protrusion 157 formed on the surface of the light guide plate 151 increases, causing a light loss coming from reflection and refraction of the incident light, and if the distance "d" between adjacent protrusions 157 is over about 3 mm, the optical sheet 250 supported by the protrusion 157 can overhang or sag, causing improper diffusion of the light.

Therefore, it is beneficial that adjacent projections 157 are symmetric in left/right directions with respect to the surface of the light guide plate 151, and formed at an appropriate distance and number.

Depending on cases, it is beneficial that the protrusion 157 is formed of a material that is transparent and has a low surface tension so that the protrusion 157 can be adhered to the light guide plate 151, easily.

For an example, the protrusion 157 may be formed of PMMA (Polymethylmethacrylate), polycarbonate, cyclic olefin copolymer, and so on, or, depending on cases, the same material with the light guide plate 151.

In the meantime, the light source 153 is at a side of the light input part 152 for emitting the light to the light guide plate 151, and may include at least one LED 152a and a circuit board 153b.

The LED 153a, at the side of the light input part 152, generates and emits the light to the light input part 152.

The circuit board 153b supports and couples to undersides of the LED 153a and the light input part 152.

The light input part 152 is projected from the side of the light guide plate 151 for decreasing relatively dark portions between the LEDs 153a, and at least partially preventing the light from the LED 153a from leaking directly through interconnected portions between the back-light units.

The reflection plate 154 couples to an underside of the light guide plate 151 for reflecting the light to the light guide plate 151, and covers the second to fourth sides 151b, 151c and 151d of the light guide plate 151 for adjusting transmission of the light from the light guide plate 151 to an outside of the back-light unit or adjacent modules.

An upper side of the reflection plate 154 has a slope opposite to the slope of the underside of the light guide plate 151.

Accordingly, if the reflection plate 154 is placed on the light guide plate 151 such that the upper side of the reflection plate 154 couples to the underside of the light guide plate 151, the underside of the reflection plate 154 and the upper side of the light guide plate 151 are parallel to each other.

That is, the reflection plate 154 has opposite first and second sides, and has a thickness which becomes the thicker as the thickness goes from the first side to the second side the more.

The light source 153 is positioned at the first side of the reflection plate 154, and a cover projection 154b is formed at the second side of the reflection plate 154.

The cover projection 154b covers an upper side of the light source of an adjacent back-light unit when a plurality of the back-light units are assembled, and may prevent the LED 153a at the light input part 152 of the light guide portion 151 from showing on a display screen.

As a fastening member for coupling to the light guide plate 151, the reflection plate 154 may have at least one fastening recess 154a at an upper side periphery.

As described, the fastening protrusion 155 of the light guide plate 151 is placed in the fastening recess 154a in the reflection plate 154 for maintaining a position even against an external impact or vibration.

Moreover, the reflection plate 154 has opposite third side and fourth side, wherein the third side has a side hook recess 154c as a fastening member for coupling to the back-light unit adjacent thereto at the time a plurality of the back-light units are assembled, and the fourth side has a side hook 158 as a member for coupling to the back-light unit adjacent thereto.

If the back-light units are fabricated as modules and a plurality of the back-light units assembled, the back-light units can be coupled together as the side hook recess 154c in the reflection plate 154 is placed on the side hook of the back-light unit adjacent thereto, and the side hook 158 of the reflection plate 154 is placed in the side hook recess in the back-light unit adjacent thereto.

The side hook 158 and the side hook recess 154c enable easy alignment and assembly of the plurality of the back-light units in a transverse (or longitudinal, as seen from the other side) direction.

As a fastening member for fastening the back cover (not shown) of the back-light unit, the reflection plate 154 has at least one underside hook 156 at an underside periphery for coupling to the back cover (or a frame; not shown).

The underside hook 156 enables easy fastening of the reflection plate 154 to the back cover of the back-light unit without screws like the related art.

Figure 22:
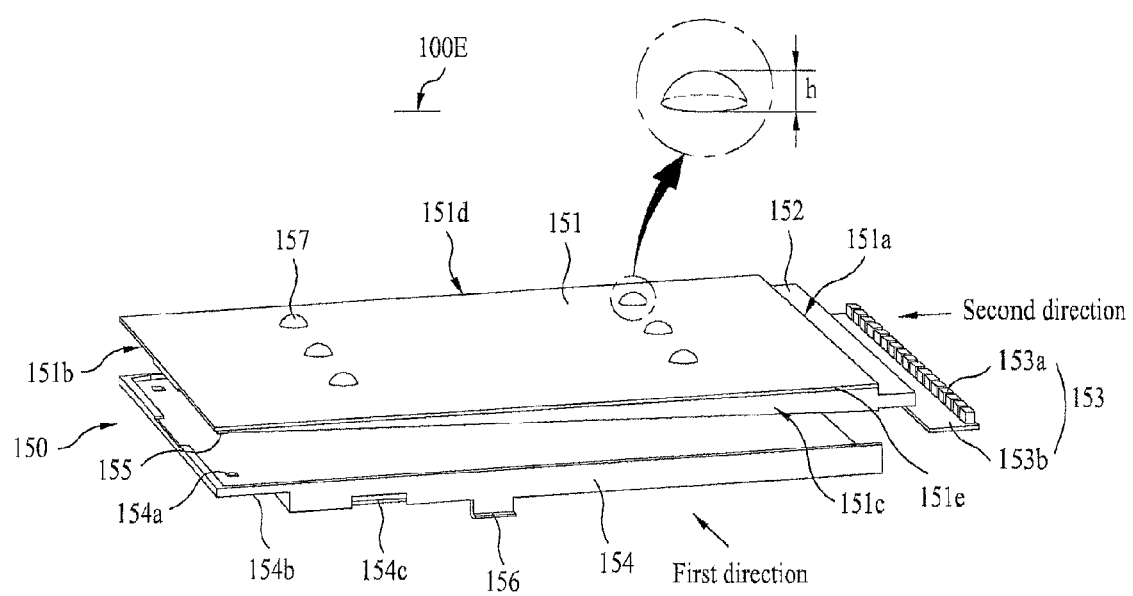
FIGS. 22~27 illustrate diagrams each showing a structure of a back-light unit in accordance with a fifth preferred embodiment of the present invention.
Figure 23:
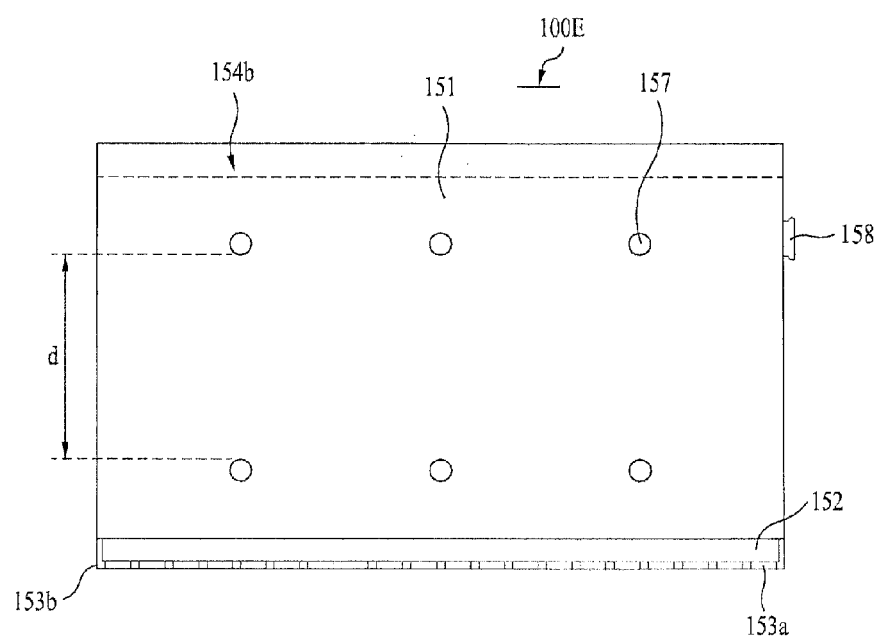
Figure 24:
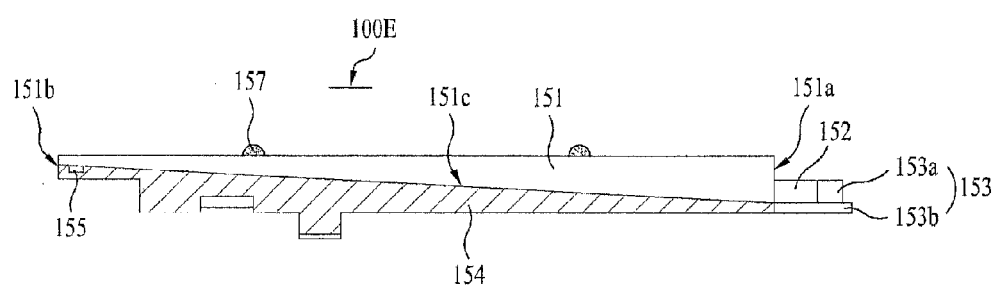
Figure 25:
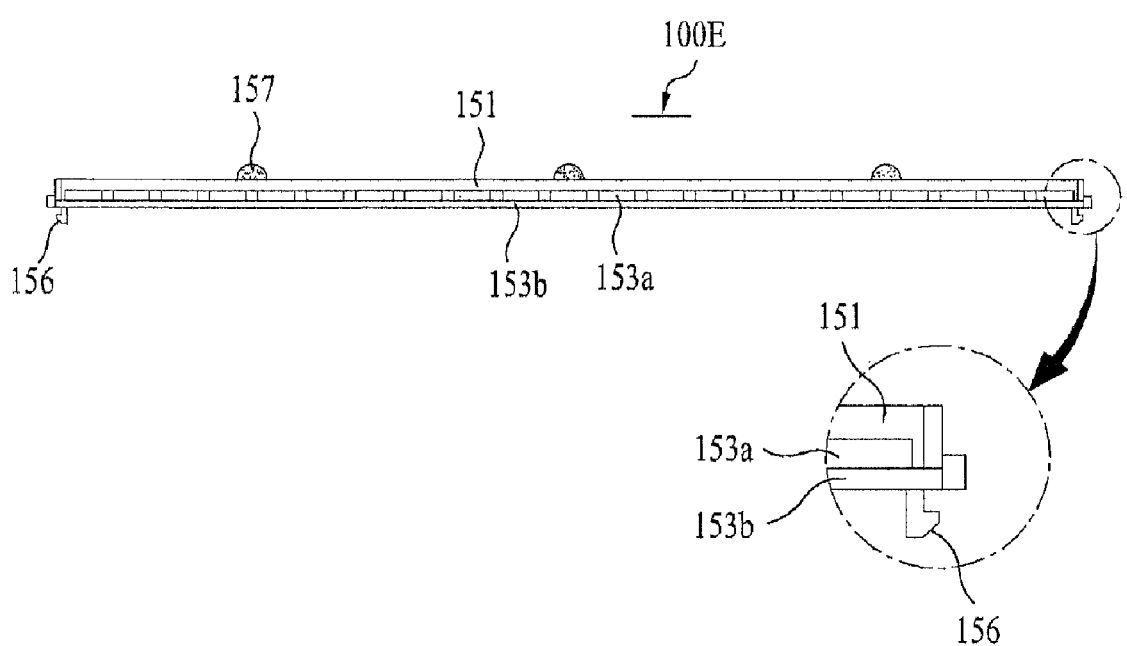
Figure 26:
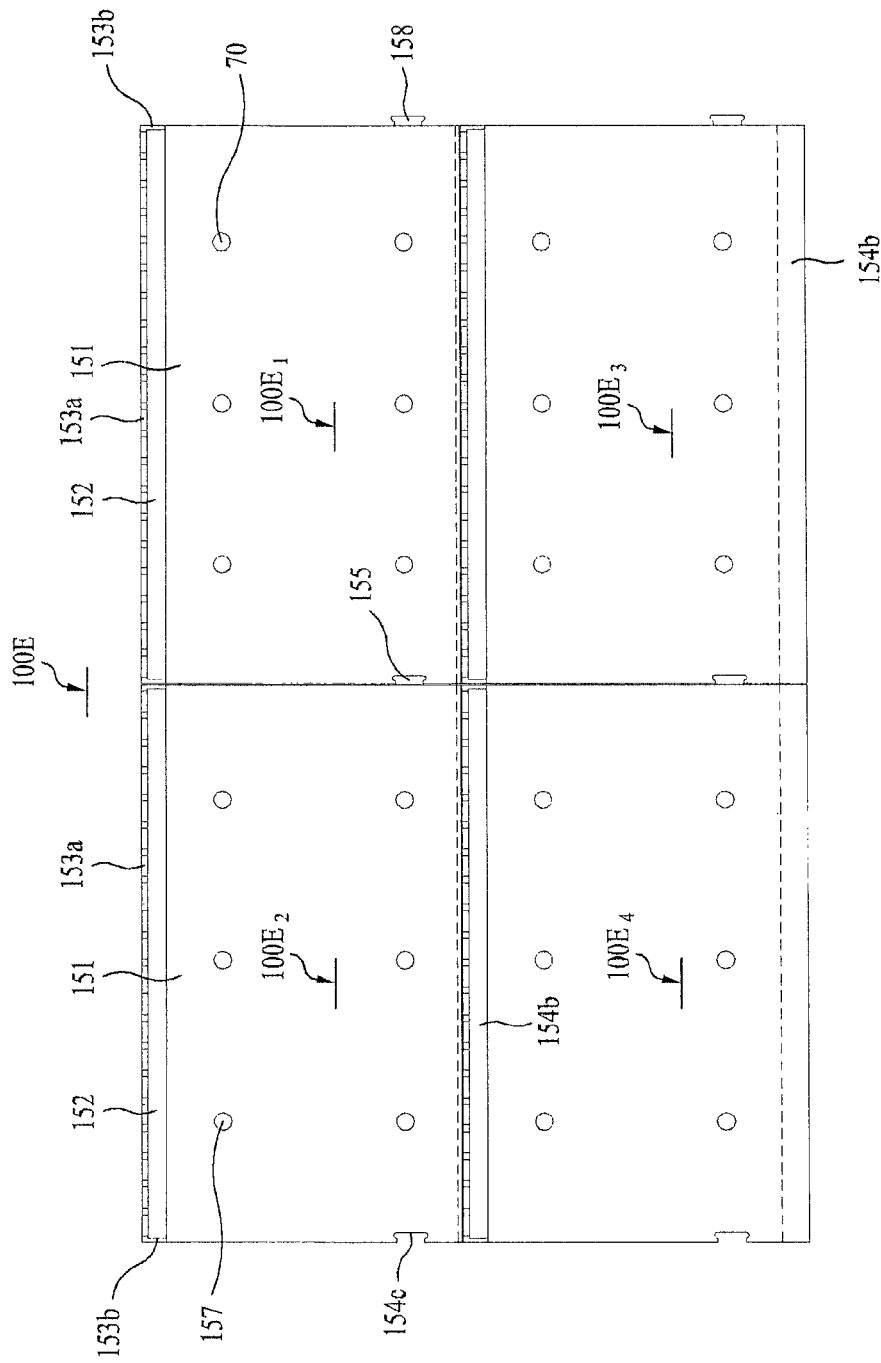

FIG. 26 illustrates a large sized back-light unit having a plurality of the back-light units in FIG. 22 fabricated into modules and assembled together.

Referring to FIG. 26, after fabricating the light guide portion 150 having the light guide plate 151 and the reflection plate 154 under the light guide plate 151 as a module, the side hook 158 of one module may be placed in the side hook recess 154c in the other back-light unit adjacent thereto to couple the one module to the other back-light unit.

By connecting the back-light units on opposite side of the back-light unit, a plurality of the back-light units can be aligned in a transverse direction.

Referring to FIG. 27, in the back-light units arranged in a longitudinal direction, the cover projection 154b of the reflection plate 154 of the back-light unit covers an upper side of the LED 153a of the back-light unit adjacent thereto, for at least partially preventing the LED 153a at the light input part 152 of the light guide plate 151 from showing on a display screen.

Since the back-light unit has an underside hook 156, for fastening to the back cover (not shown) of the back-light unit.

The protrusion 157 on the upper side of the light guide plate 151 supports the optical sheet 250, for retaining a gap of the air layer between the light guide plate 151 and the optical sheet 250.

The air layer diffuses the light from the light guide plate 151 like a related art diffusion plate owing to a difference of refractive indices.

The light diffused at the air layer incidents on the display panel such that the light is distributed throughout display panel uniformly as the light pass through the optical sheet 250, enabling the display panel to obtain a relatively uniform brightness.

As an example, the optical sheet 250 has the diffusion sheet 250a, a prism sheet 250b, and a protective sheet 250c stacked in succession, wherein the diffusion sheet 250a scatters the light from the light guide plate 151 to make a brightness distribution of the light uniform, the prism sheet 250b converges the light to the display panel, and the protective sheet 250c protects the prism sheet 250b.

Thus by forming the gap of the air layer between the light guide plate and optical sheet with the projection of the light guide plate, an optical unevenness taking place at a boundary of adjacent light guide plates can be reduced.

A Sixth Embodiment

Figure 28:
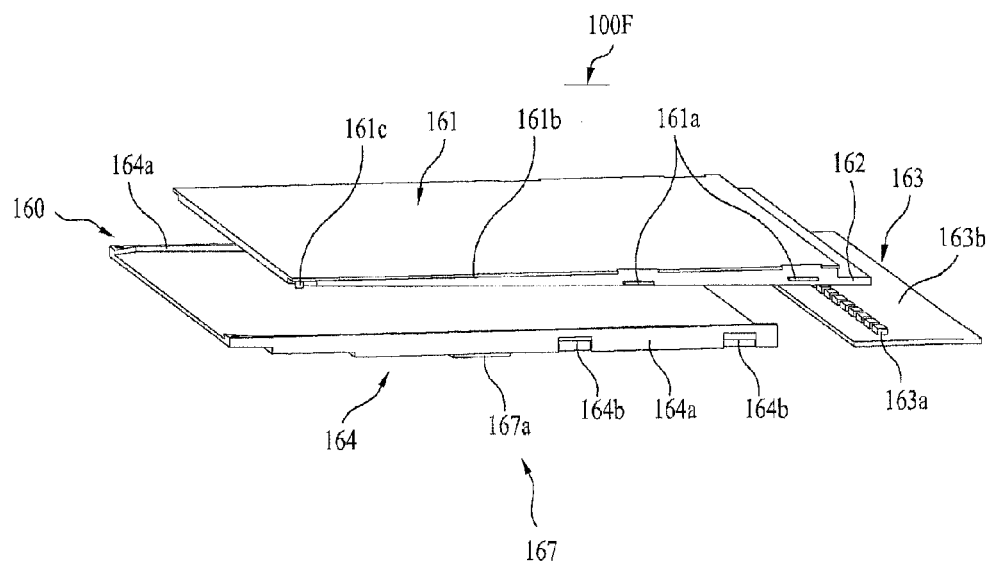
FIGS. 28~33 illustrate diagrams each showing a structure of a back-light unit in accordance with a sixth preferred embodiment of the present invention.
Figure 29:
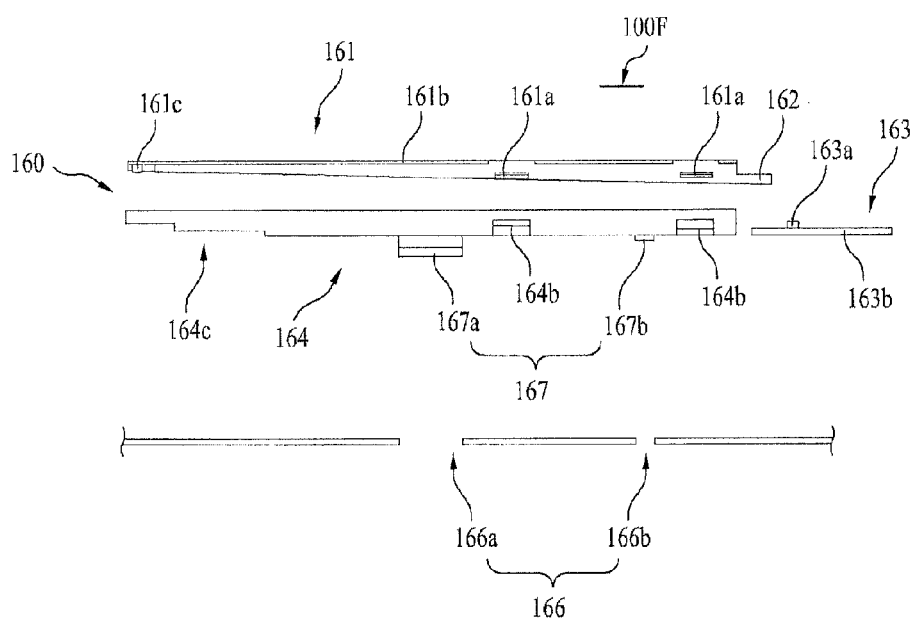

Referring to FIGS. 28 and 29, the back-light unit 100F in accordance with a sixth preferred embodiment of the present invention includes a light guide plate 161, a light source 163, a reflection plate 164 and a frame 165. Things applied to the foregoing embodiments can be applied to part unexplained herein. The light guide plate 161 and the reflection plate together may be called as a light guide portion or a light guide module 160.

The light guide plate 161 has a flat upper side, a sloped underside, and a light input part 162 at a portion of a side for receiving a light from the light source 163.

The light guide plate 161 has a thickness which becomes the thinner as the thickness goes the farther from the light input part 162, making the underside of the light guide plate 161 sloped on the whole.

The light source 163 includes a circuit board 163b having the LED 163a mounted thereon.

The light input part 162 of the light guide plate 161 may have a thickness thinner than the light guide plate 161 and projected from the light guide plate 161. That is, since the light input part 162 is projected from an effective screen, the light input part 162 can decrease a relatively dark portion caused by a gap between the light sources 163, and prevent the light from leaking direct from the light source 163 through a connection portion between the light guide plates 161.

The reflection plate 164 is coupled to an underside of the light guide plate 161, for an example, by means of a fastening protrusion 161a of the light guide plate 161 to a fastening hole 164b in the reflection plate 164.

In this instance, the reflection plate 164 may have a rim 164a at least a side for the light guide plate 161 to couple to the reflection plate 164, securely.

Referring to FIGS. 28 and 29, the rim 164a is shown angled upward from opposite edges of the reflection plate 164 and extended therefrom, with the light guide plate 161 disposed therebetween.

At least one fastening hole 164b may be formed in the rim 164a, enabling the fastening protrusion 161a on the light guide plate 161 to be fastened to the fastening hole 164b more securely.

The light guide plate 161 may have projection 161b along opposite edges of the light guide plate 161 in contact with edges of the rim 164a for positioning the light guide plate 161 with respect to the reflection plate 164.

Since the projection 161b is positioned over the edge of the rim 164a and connected to the projection 161b on an adjacent light guide plate 161, the rim 164a can prevent the light from being discontinued and adjust an extent of light coupling to an adjacent light guide portion 160.

In a case the back-light units 100F in accordance with the sixth preferred embodiment of the present invention having the light guide plate 161 and the reflection plate 164 are connected side by side, it can be made that the rim 164a is invisible if seen from a light output side.

The rim 164a may also include a function of the reflection plate 164, to cover at least a portion (a portion excluding the projection 161b) of a side of the light guide plate 161, such that, when the back-light units in accordance with the sixth preferred embodiment of the present invention adjacent to each other are coupled together as modules, the transmission of the light to an adjacent back-light unit is adjusted, enabling to adjust a relatively bright line or a dark line formed at a boundary of the modules.

Since the light input part 162 and the edge opposite thereto of the light guide plate 161 are not covered with the rim 164a, possible formation of relatively bright/dark line at the boundary of the light guide plates 161 and relatively dark portion at the light input part 162 caused by the step of the light input part 162 can be reduced, thereby improving uniformity of the light from a plurality of the light guide plates 161 significantly.

In the meantime, by providing a connection part 161c at the other edge of the light input part 162 of the light guide plate 161 for fastening to the reflection plate 164 additionally, the light guide plate 161 can be coupled to the reflection plate 164 more rigidly.

When the light guide plate 161 is coupled to the reflection plate 164 together, the edge 164c of the reflection plate 164 on an opposite side of the light input part 162 has a step such that the edge 164c is positioned over adjacent light input part 162, for an example, as shown in FIG. 29.

If the edge 164c of the reflection plate 164 is positioned over the adjacent light input part 162 thus, direct emission of the light from the LED 163a at the light source 163 to an outside of the back-light unit can be prevented.

That is, by placing the LED 163a at a side of the light guide plate 161 and the reflection plate 164 formed in a small size, an adequate light quantity can be secured, heat from the LED 163a can be dispersed, and, especially, the LED 163a at the side of the light guide plate 161 and the reflection plate 164 can be hidden, optically.

Figure 30:
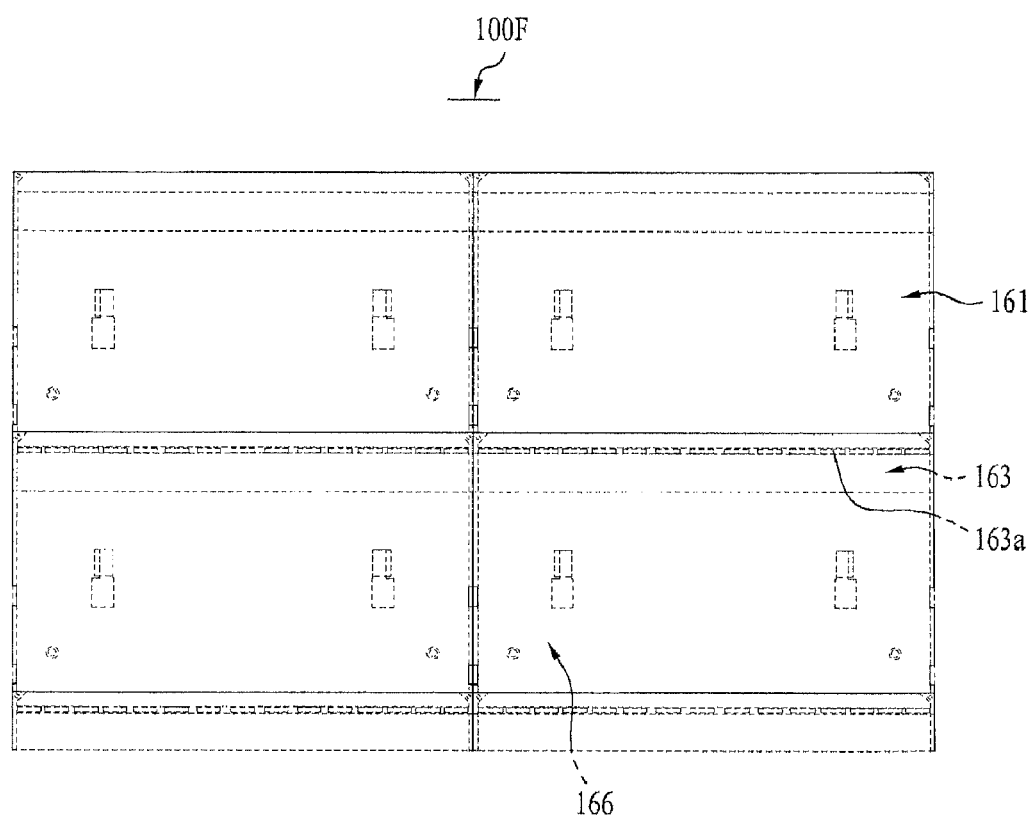

Referring to FIG. 30, since a large sized back-light unit can be fabricated by coupling the light guide plate 161 and the reflection plate 164 adjacent to each other, it is beneficial to maintain a relative position of the light guide plate 161 and the reflection plate 164 constant.

That is, when a plurality of the back-light units 100F each having the light guide plate 161 and the reflection plate 164 in accordance with the sixth preferred embodiment of the present invention are coupled together, size variation of the light guide plate 161 and the reflection plate 164 of the back-light unit can be kept small.

Thus, when the plurality of the back-light units 100F in accordance with the sixth preferred embodiment of the present invention are coupled together to form the large sized back-light unit, the back-light unit 100F includes a light guide portion connection part 167 for coupling the light guide portion 160 having the light guide plate 161 and the reflection plate 164 to a frame 165.

The light guide portion connection part 167 is fastened to a frame connection part 166 at the frame 165.

Figure 31:
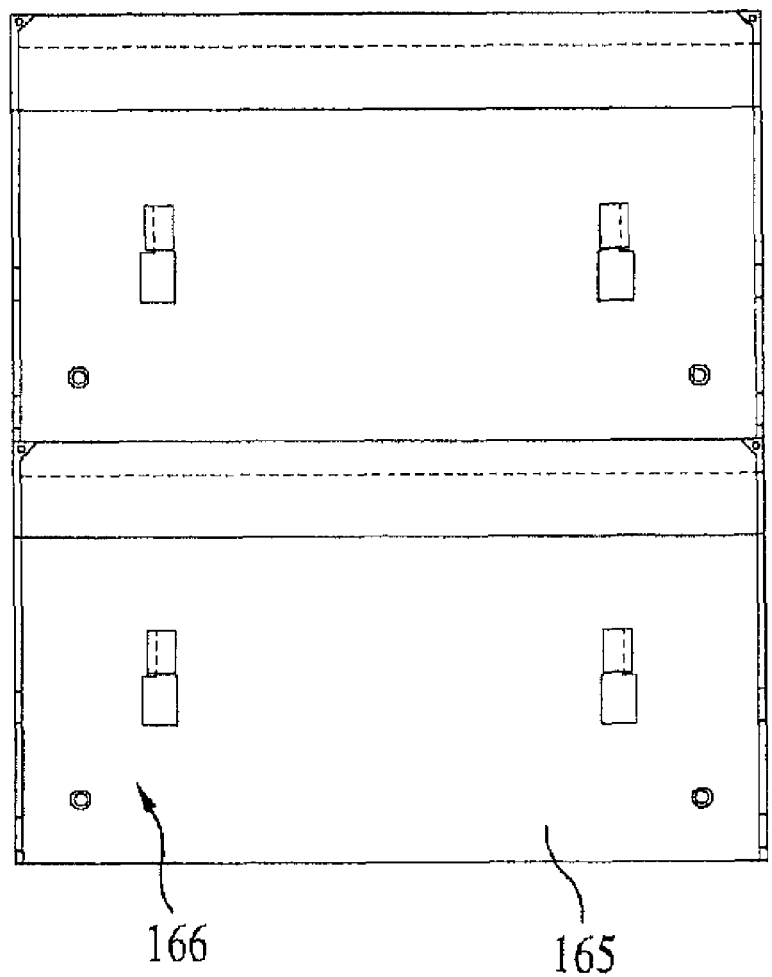
Figure 32:
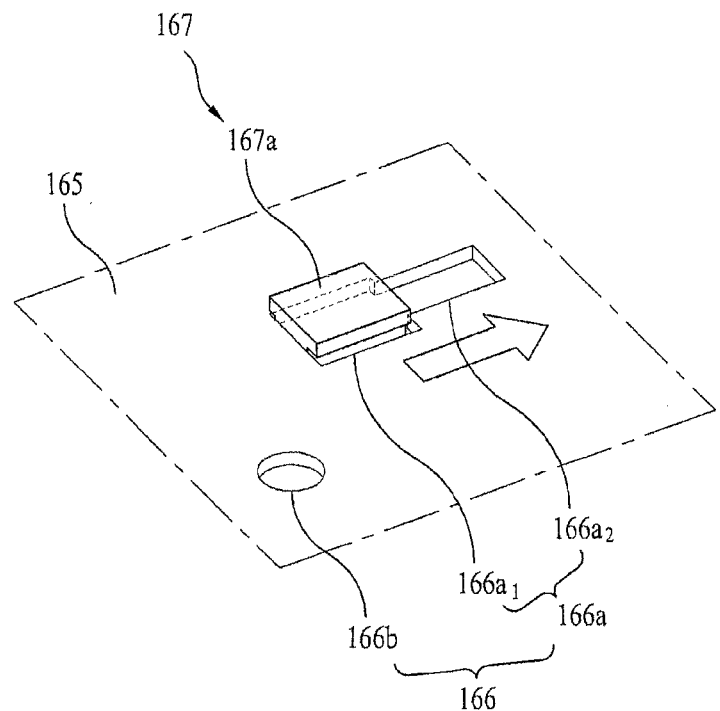
Figure 33:
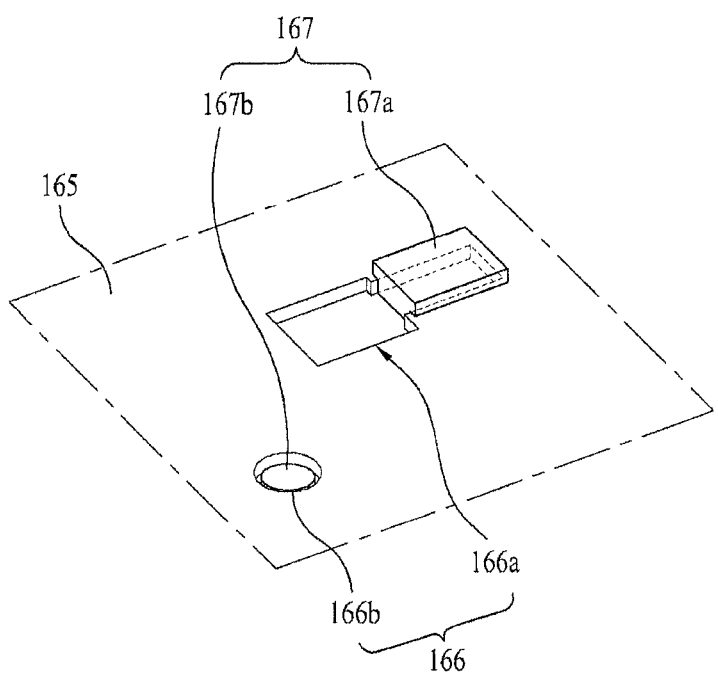

In this instance, referring to FIGS. 31 to 33, the light guide portion connection part 167 can be slidably fastened to the frame connection part 166.

That is, the light guide portion connection part 167 has a projection 167a, and the frame connection part 166 has a sliding slot 166a for placing the projection 167a therein and sliding the projection 167a thereon until the projection is fastened.

Referring to FIG. 32, the sliding slot 166a has a first slot $166a_1$ for placing the projection 167a therein, and a second slot $166a_2$ extended from and narrower than the first slot $166a_1$.

Accordingly, by fastening the light guide portion connection part 167 to the frame connection part 166, the light guide plate 161 and the reflection plate 164 can be coupled to the frame 165, easily.

That is, without additional screw fastening, the light guide plate 161 and the reflection plate 164 can be coupled to the frame 165, a fastening direction (an arrow direction in FIG. 32) of the slidable fastening can be in any direction of upper/lower, left/right directions.

Moreover, referring to FIG. 33, the light guide portion connection part 167 may have a supplementary (or auxiliary) protrusion 167b additionally and the frame connection part 166 may have an inserting hole (opening) 166b additionally for inserting the supplementary protrusion 167b therein.

By making the supplementary protrusion 167b and the inserting hole 166b to be fastened together at a position the protrusion 167a and the sliding slot 166a are fastened together, after the light guide plate 161 and the reflection plate 164 are slidably coupled to the frame 165, the coupling state can be kept rigidly.

In the meantime, as shown, it may be favorable that the light guide portion connection part 167 is positioned at the reflection plate 164.

Thus, the light guide plate 161 and the reflection plate 164 coupled adjacent to each other can be coupled in a transverse direction or a longitudinal direction, and by connecting the light guide plate 161 and the reflection plate 164 and the light source 163, a back-light unit for a large sized display device can be fabricated.

Moreover, by connecting the light guide plate 161 and the reflection plate 164 in a tiling fashion, reliability of the large sized back-light unit can be improved, and local dimming in which the light source 163 is driven partially according to an image can be applicable, enabling to produce an image of a high contrast ratio.

A Seventh Embodiment

Figure 34:
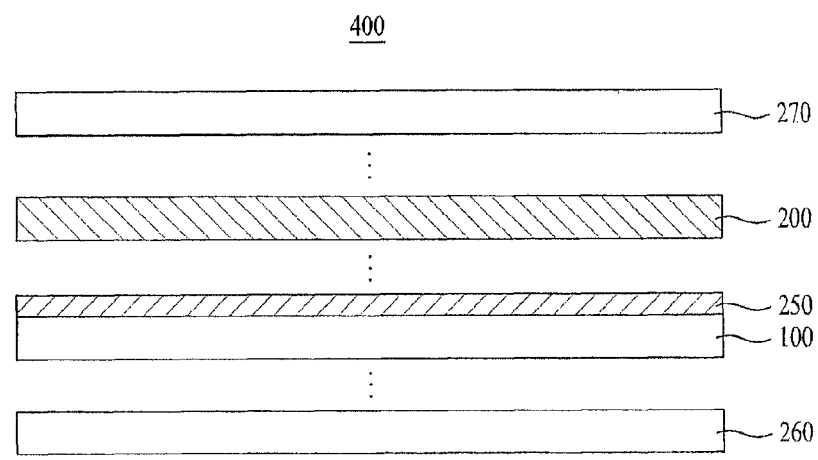
FIG. 34 illustrates an exploded view of an exemplary liquid crystal display device having a back-light unit in accordance with a seventh preferred embodiment of the present invention applied thereto.
Figure 35:
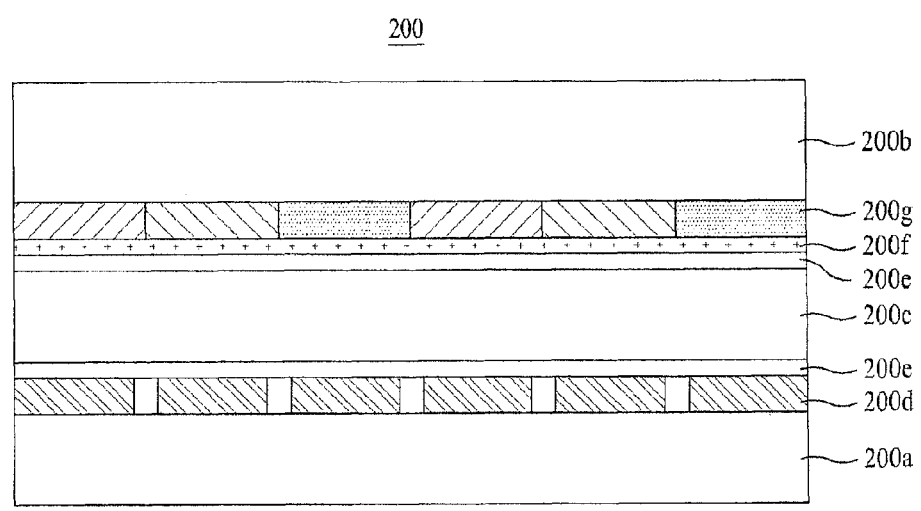
FIG. 35 illustrates a section of an exemplary liquid crystal display panel in accordance with a seventh preferred embodiment of the present invention.

Referring to FIGS. 34 and 35, a liquid crystal display device 400 can be fabricated by using the back-light unit in accordance with one of the first to sixth embodiment of the present invention (reference numerals 100A to 100F, hereinafter represented with a reference numeral 100) described before and the liquid crystal display panel 200.

Referring to FIG. 35, the liquid crystal display panel 200 on the back-light unit 100 of the present invention includes an upper substrate 200a, a lower substrate 200b and a liquid crystal layer 200c injected between the upper substrate 200a and the lower substrate 200b.

On one side of the liquid crystal display panel 200, there is a driver (not shown) for driving the liquid crystal display panel.

Referring to FIG. 34, there are a lower cover 260 which covers the back-light unit 100 under the back-light unit 100, and an upper cover 270 which covers a front of the liquid crystal display panel 200 on the liquid crystal display panel 200.

The liquid crystal display panel 200 includes a matrix of liquid crystal cells, for forming an image by controlling light transmission ratios of the liquid crystal cells according to information on an image signal from the driver.

The driver may include a flexible printed circuit board FPC, a driver chip mounted to the FPC, and a printed circuit board PCB connected to the other side of the FPC.

In the meantime, referring to FIG. 35, the back-light unit 100 may be position in rear of the liquid crystal display panel 200, and a plurality of optical sheets 250 may be provided on the back-light unit 100.

The optical sheets (Also, refer to FIG. 27.) are on a back side of the liquid crystal display panel 200, and may include a diffusion sheet 250a, a prism sheet 250b, and a protective sheet 250c.

The diffusion sheet 250a diffuses the light from the back-light unit 100 and supplies the light to the liquid crystal display panel 200.

The prism sheet 250b has an array of triangular prisms on an upper side, for covering the light diffused at the diffusion sheet in a direction perpendicular to a plane of the liquid crystal display panel 200 position over the prism sheet 250b.

The micro-prism on the prism sheet 250b has a predefined angle. Most of the light passed through the prism sheet 250b proceeds perpendicular to the prism sheet 250b to provide a uniform luminance distribution.

The protective sheet 250c at the uppermost side protects the prism sheet 250b which is susceptible to scratch.

Referring to FIG. 35, formed on the lower substrate 200a of the liquid crystal display panel 200, there are a matrix of gate lines and data lines, and a pixel electrode and a thin film transistor TFT 200d at every cross point of the gate lines and the data lines.

A signal voltage applied to the liquid crystal display panel 200 through the thin film transistor 200d is supplied to the liquid crystal layer 200c by the pixel electrode, and the liquid crystal layer 200c is aligned according to the signal voltage to fix a light transmission ratio.

Formed on the upper substrate 200b, there are a color filter 200g having R, G, B pixels for producing a predefined color as the light passes therethrough, and a common electrode 200f of a transparent conductive material, such as ITO (Indium Tin Oxide) or IZO (Indium Zinc Oxide).

Alignment films may be positioned on upper/lower sides of the liquid crystal layer 200c.

The liquid crystal display device can maximize a performance by using the back-light unit in accordance with one of the first to sixth embodiments of the present invention.

An Eighth Embodiment

Figure 36:
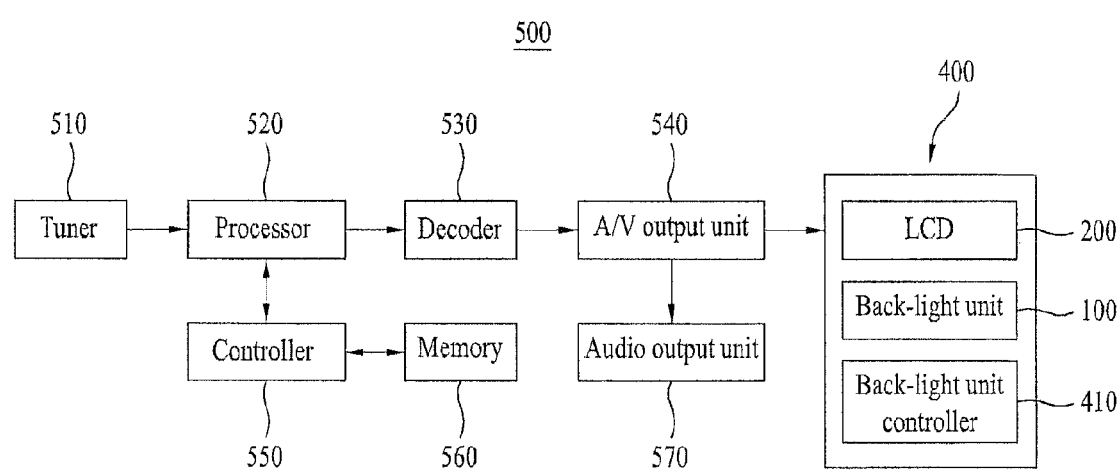
FIG. 36 illustrates a block diagram of a liquid crystal TV set having a liquid crystal display device in accordance with an eighth preferred embodiment of the present invention applied thereto.

FIG. 36 illustrates a block diagram of a liquid crystal TV set having a liquid crystal display device in accordance with an eighth preferred embodiment of the present invention applied thereto.

The liquid crystal TV set has a system as shown in FIG. 36, for transmission and display of a broadcasting data stream from a tuner 510 to the liquid crystal display device 400 through a processor 520, a decoder 530, and an A/V output unit 540.

The tuner 510 or the processor 520 is controlled by a control unit 550, and the controller 550 may include a memory 560 additionally.

If a user selects and set a broadcasting channel by operating the liquid crystal TV set 500, the controller 550 controls the tuner 510 and the processor 520, to select a broadcasting channel the user set thus, and the processor 520 splits the data stream of a broadcasting program provided through the broadcasting channel into an audio and video data, and forwards the audio and video data split thus.

Then, the decoder 530 decodes the data the processor 520 into audio and video signals, for forwarding the audio and video signals to the liquid crystal display device 400 or an audio output unit 570 such as a speaker unit through the A/V output unit 540.

In this instance, the back-light unit 100 is driven by a back-light unit controller 410, for illuminating an image forwarded to the liquid crystal display panel 200.

In the meantime, the processor 520 may receive the broadcasting data stream through the Internet.

Thus, the back-light unit 100, the liquid crystal display device 400 with the back-light unit 100 and the liquid crystal TV set 500 with the liquid crystal display device 400 of the present invention have been described in detail.

In the back-light unit 100 of the present invention, an upper side width of the light input part is formed smaller than a lower side width of the light input part, shifting a light path of the light reflected totally, to increase a light quantity of the light forwarded upward from the light guide plate.

The arrangement of the LEDs at a side of the light guide plate permits to reduce a total thickness of the back-light unit, thereby enabling to reduce a display panel, such as the LCD.

Fabricating the back-light unit having the light guide plate and the LEDs coupled thereto as a module, and assembling a plurality of the modules by connecting the modules in a tiling fashion permits to provide a back-light unit suitable for a large sized display device.

The fastening hook and fastening member on the reflection plate of the back-light unit fabricated as the module permits easy and simple assembly, not only with an adjacent back-light unit, but also with a back cover of the back-light unit.

The projection on the light guide plate to form an air layer gap between the light guide plate and the optical sheet reduces an optical unevenness taking place at a boundary of adjacent light guide plates.

The formation of fastening members at the light guide plate modules permits easy and simple assembly with an adjacent module, as well as with the frame.

The applicability of the local dimming in which the light source is driven partially according to an image permits to produce an image of a high contrast ratio.

A portion of the boundary of the adjacent modules can be made to be coupled optically, and an extent of the optical coupling of the modules can be adjusted. By adjusting or regulating the extent of the optical coupling, a relatively bright line or a dark line on light forwarding surface or on an interconnected part between adjacent modules can be prevented or reduced.

According to this, in case the back-light unit is fabricated by connecting the plurality of modules side by side, a substantially uniform light can be formed by decreasing optical singular point at the interconnected part.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or preferred embodiment, it is submitted that it is within the purview of one skilled in the art to effect such feature, structure, or characteristic in connection with other ones of the embodiments or preferred embodiments.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight comprising:
    a plurality of light guide plates, the light guide plate having a light input part, wherein an upper surface of the light guide plates has a non-uniform surface; and
    a light source associated with a corresponding one of the light guide plates, each light source including a plurality of light emitting diodes (LEDs), wherein at least one LED of the light source is independently controlled,
    wherein the light guide plate has a light input part projected from a first edge of the light guide plate in a side direction, wherein the light guide plate has a first light coupling surface on the first edge of the light guide plate, wherein the light guide plate has a second light coupling surface on a second edge of the light guide plate, wherein the first edge is opposite the second edge, and wherein an area of the first light coupling surface is substantially larger than an area of the second light coupling surface.

2. The backlight of claim 1, further comprising a controller, wherein the controller independently controls a brightness of the at least one LED of each of the light sources.

3. The backlight of claim 1, wherein a brightness of the light source is controlled according to image data associated with the light source.

4. The backlight of claim 1, further comprising a reflection plate arranged on a lower surface of the light guide plate.

5. The backlight of claim 4, wherein the reflection plate is coupled to the lower surface and at least a portion of a side surface of the light guide plate.

6. The backlight of claim 4, wherein the light guide plates plate has an inclined surface.

7. The backlight of claim 4, wherein the light guide plate has a first connection part, and wherein the reflection plate has a second connection part connected to the first connection part.

8. The backlight of claim 1, wherein the light source includes a circuit board located along at least one side of the corresponding light guide plate proximate to the light input part, and wherein the LEDs are arranged on the circuit board.

9. A liquid crystal display device having the backlight of claim 1, the liquid crystal display device comprising:
a liquid crystal display panel and the backlight.

10. A backlight unit comprising:
a circuit board;
a light emitting diode (LED) source arranged on the circuit board; and
a plurality of light guide plates including a light input part receiving light emitted from the corresponding LED source,
wherein an upper surface of the light guide plates has a non-uniform surface,
wherein the light guide plate has a light input part projected from a first edge of the light guide plate in a side direction, wherein the light guide plate has a first light coupling surface on the first edge of the light guide plate, wherein the light guide plate has a second light coupling surface on a second edge of the light input guide plate, wherein the first edge is opposite the second edge, and wherein an area of the first light coupling surface is substantially larger than an area of the second light coupling surface,
wherein the first light coupling surface is spaced apart from the second light coupling surface of an adjacent light guide plate, and wherein at least one LED is independently controlled.

11. The backlight unit of claim 10, further comprising a controller to independently control a brightness of the LED.

12. The backlight unit of claim 11, wherein the brightness of the LED is controlled according to image data associated with the LED.

13. The backlight unit of claim 10, further comprising a reflection plate arranged on a lower surface of the light guide plate.

14. The backlight unit of claim 10, wherein the second edge is arranged such that the second edge of the one of the light guide plate covers the light input part of another one of the light guide plates.

15. The backlight unit of claim 10, wherein the light input part has a step shape along the first edge of the light guide plate.

16. The backlight unit of claim 15, wherein a thickness of the light input part has a thickness of the step or less.

17. A backlight comprising:
a light guide having at least two light guide plates and at least two light sources, each light source corresponding to a different one of the at least two light guide plates, and each light source including a plurality of light emitting diodes (LEDs),
wherein the light guide plate has a light input part projected from a first edge of the light guide plate in a side direction,
wherein the light guide plate has a first light coupling surface on the first edge of the light guide plate,
wherein the light guide plate has a second light coupling surface on a second edge of the light input guide plate, wherein the first edge is opposite the second edge,
wherein an area of the first light coupling surface is substantially larger than an area of the second light coupling surface, and wherein at least one LED of each of the light sources is independently controlled.

18. The backlight of claim 17, further comprising a controller to independently control a brightness of the at least one LED of each of the light sources.

19. The backlight of claim 17, wherein the first light coupling surface is spaced apart from the second light coupling surface of the adjacent light guide plate.

20. The backlight of claim 17, wherein the first light coupling surface is located on the light guide plate over the light input part of the light guide plate.

21. The backlight of claim 17, wherein a vertical width of the first light coupling surface is greater than a vertical width of the second light coupling surface.

22. The backlight of claim 1, wherein the non-uniform surface includes at least one protrusion.

23. The backlight of claim 22, wherein the protrusion is configured to support an optical sheet.

24. The backlight of claim 1, wherein a vertical width of the first light coupling surface is greater than a vertical width of the second light coupling surface.

25. The backlight of claim 1, wherein the first light coupling surface is spaced apart from the second light coupling surface of the adjacent light guide plate.

26. The backlight of claim 1, wherein the first light coupling surface of the light guide plate is located over the light input part of the light guide plate.

27. The backlight of claim 10, wherein the non-uniform surface includes at least one protrusion.

28. The backlight of claim 27, wherein the protrusion is configured to support an optical sheet.

29. The backlight of claim 10, wherein a vertical width of the first light coupling surface is greater than a vertical width of the second light coupling surface.

30. The backlight of claim 10, wherein the first light coupling surface of the light guide plate is located over the light input part of the light guide plate.

31. The backlight of claim 17, wherein the light guide includes a reflection plate coupled to one of the light guide plates.

32. The backlight unit of claim 5, wherein the portion of the reflection plate is provided on the side surface of the light guide plate such that the second edge of the light guide plate that includes the second light coupling surface is aligned with the portion of the reflection plate on the side surface of the light guide plate, and wherein the portion of the reflection plate is adjacent to the first light coupling surface of an adjacent light guide plate.

33. The backlight of claim 13, wherein a portion of the reflection plate is provided on a side of the light guide plate such that the second edge of the light guide plate that includes the second light coupling surface is aligned with the portion of the reflection plate on the side of the light guide plate, and wherein the portion of the reflection plate is adjacent to the first light coupling surface of an adjacent light guide plate.

34. The backlight of claim 18, wherein a brightness of the LEDs is controlled according to image data associated with the LEDs.

35. The backlight of claim 31, wherein a portion of the reflection plate is provided on a side of the light guide plate such that the second edge of the light guide plate that includes the second light coupling surface is aligned with the portion of the reflection plate on the side of the light guide plate, and wherein the portion of the reflection plate is adjacent to the first light coupling surface of an adjacent light guide plate.

36. The backlight of claim 31, wherein the light guide plate has a first connection part.

37. The backlight of claim 36, wherein the reflection plate has a second connection part connected to the first connection part.

38. The backlight of claim 37, wherein the second connection part includes an opening, and wherein the first connection part protrudes from a side surface of the first one of the light guide plates into the opening.

39. The backlight of claim 36, wherein the first connection part is located on a side surface of the first one of the light guide plates.

40. The backlight of claim 17, wherein the light sources further include a circuit board located along at least one side of the corresponding light guide plate proximate to the light input part, and the corresponding LEDs are arranged on the circuit board.

41. The backlight of claim 17, wherein the light guide plate has an inclined surface.

42. The backlight of claim 41, wherein the light guide plate includes a reflection plate and the reflection plate has an inclined surface that has an inclination opposite to the inclined surface of the light guide plate.

* * * * *